United States Patent [19]

Ueda et al.

[11] Patent Number: 4,907,836
[45] Date of Patent: Mar. 13, 1990

[54] WIRE HARNESS MOUNTING STRUCTURE FOR MOTOR VEHICLE DOOR

[75] Inventors: Shinichi Ueda; Michihiro Ohtaka; Yoshiaki Nakayama; Hiroaki Shinba; Hiroshi Ichikawa, all of Susono, Japan

[73] Assignee: Yazaki Corporation, Tokyo, Japan

[21] Appl. No.: 233,912

[22] Filed: Aug. 16, 1988

Related U.S. Application Data

[63] Continuation of Ser. No. 767,156, Aug. 19, 1985, abandoned.

[30] Foreign Application Priority Data

Aug. 20, 1984 [JP] Japan .................................. 59-171467
Aug. 21, 1984 [JP] Japan .................................. 59-172369
Sep. 4, 1984 [JP] Japan ........................... 59-133497[U]
Sep. 14, 1984 [JP] Japan .................................. 59-191664

[51] Int. Cl.$^4$ ........................... B60J 5/00; H02G 3/00
[52] U.S. Cl. ................................... 276/39.1; 296/146; 296/152; 174/72 A; 49/502; 307/10.1
[58] Field of Search ................. 296/146, 208, 39.1, 296/152; 174/72 A, 152 G, 153 G; 49/502; 307/10 R

[56] References Cited

U.S. PATENT DOCUMENTS

| | | | |
|---|---|---|---|
| 2,926,040 | 2/1960 | Kramer et al. | 296/146 |
| 3,009,010 | 11/1961 | Stearns et al. | 174/72 A |
| 4,065,199 | 12/1977 | Anore et al. | 174/72 A |
| 4,591,203 | 5/1986 | Furman | 296/84 A |

FOREIGN PATENT DOCUMENTS

| | | | |
|---|---|---|---|
| 97814 | 8/1981 | Japan . | |
| 0056915 | 4/1983 | Japan | 296/146 |
| 0084621 | 5/1984 | Japan | 296/146 |
| 114720 | 8/1984 | Japan . | |

Primary Examiner—Dennis H. Pedder
Attorney, Agent, or Firm—Brumbaugh, Graves, Donohue & Raymond

[57] ABSTRACT

A wire harness mounting structure for a motor vehicle door comprising a door frame and planar mounting means, detachably attached to said door frame at an internal side of its motor vehicle, having a wire harness mounted thereon and extending in a plane generally parallel to the door frame. The mounting means is either in the form of a covering board, or a combination of the covering board and an internal side board mounted between the vehicle door frame and the covering board, and, is either integrally formed with the covering board or independently, rigidly formed as in the case of an internal side board.

11 Claims, 33 Drawing Sheets

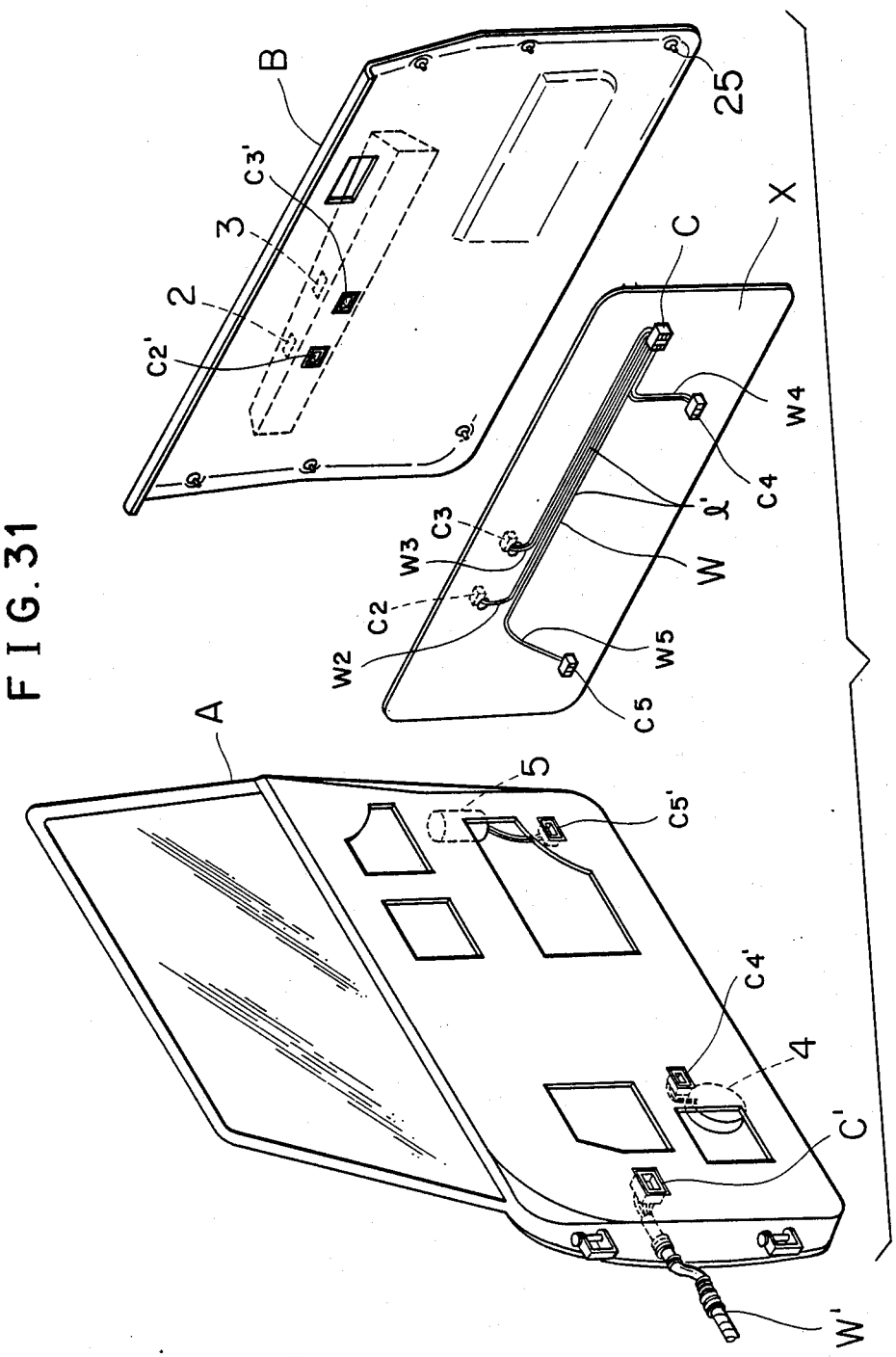

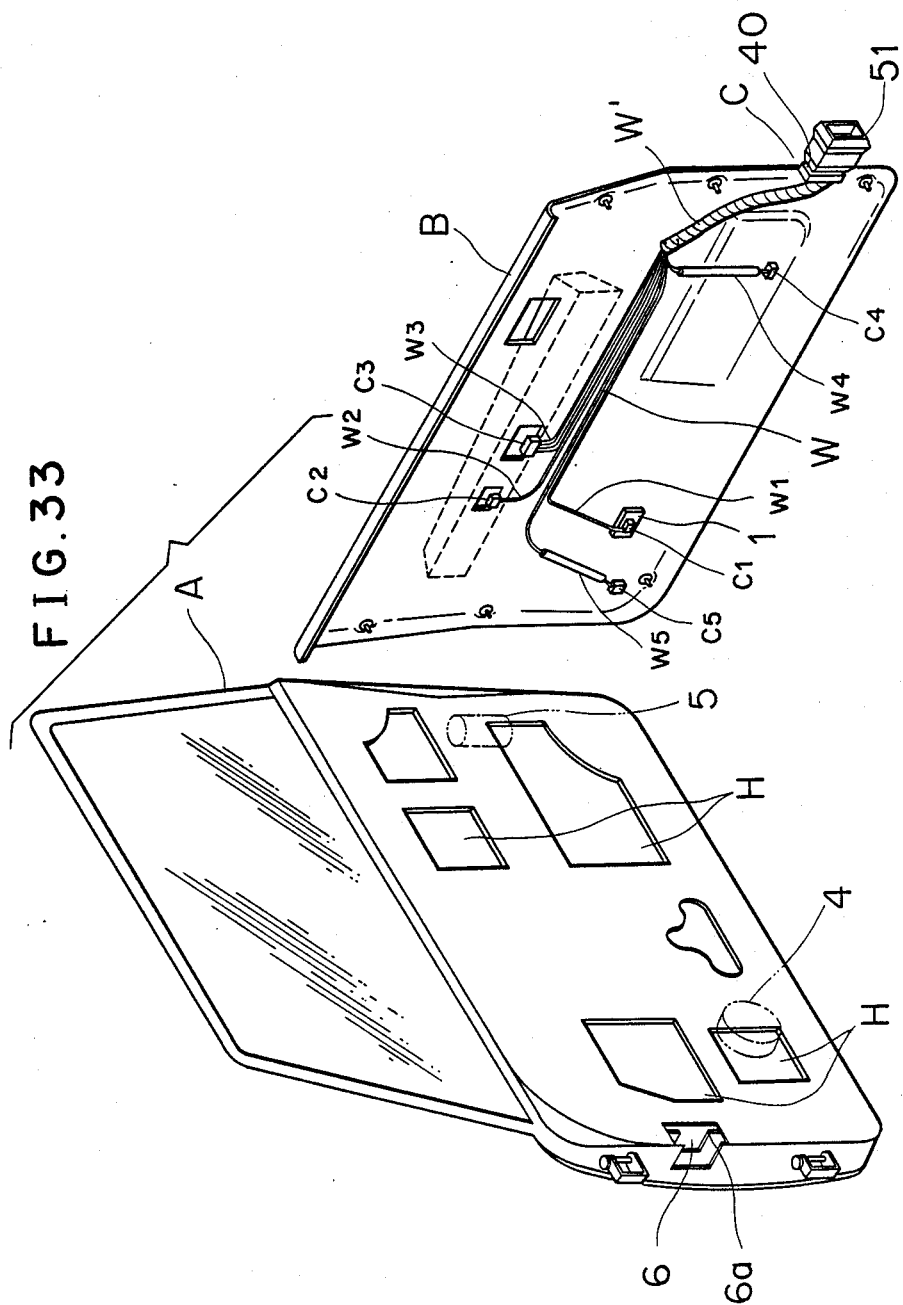

WIRE HARNESS MOUNTING STRUCTURE FOR MOTOR VEHICLE DOOR

This application is a continuation of application Ser. No. 767,156, filed on Aug. 19, 1985, abandoned.

BACKGROUND OF THE INVENTION

This invention relates to a wire harness mounting structure to be used for an electric circuit of a motor vehicle door.

Generally, a door of a motor vehicle comprises, as main component members thereof, an external door frame and an internal covering board usually called a trim cover. As shown in FIG. 1, a door wire harness W in bundle form is disposed in a space within a door frame A. The door wire harness W is provided at its end portions with branch wires w1, w2, w3, w4, w5, ... respectively, having connectors c1, c2, c3, c4, c5 ... attached thereto. The branch wires w1 and w2 are connected to a power wind motor and a solenoid for locking an automatic door within the door frame A, respectively, through the connectors c1 and c2. The branch wires w3, w4, and w5 are drawn out through a working window H and connected to a cartesi-lamp, trunk opening switch, power wind switch, etc., provided on a trim cover B by the connectors c3, c4 and c5, respectively. The door wire harness W is drawn out through a grommet G and connected to a cowl side harness at the vehicle body side by a connector C.

The door wire harness W is inserted in the door frame A through the working window H, and at the same time, the grommet G, which was fixed thereto in advance, is drawn out with its connector C through a hole of the door frame A, and similarly, a clamp K, which was likewise fixed thereto in advance, is engaged in a hole formed in the bottom portion of the door frame A, thereby fixing the door wire harness W to a predetermined wiring path. The connectors c1 and c2 are then connected to electric equipment within the door frame A, and the connectors c3, c4 and c5 are connected to electric equipment of the trim cover B. Thereafter, the trim cover B is fixed to the door frame A. However, in this conventional method, much time is required to insert the door wire harness W in the door frame A, and also to secure a clamp K to the door wire harness W. Securing the clamp K to the wire harness W is often carried out blindly in a narrow space. This considerably slows down the production of motor vehicles in the production line thereof.

In view of the above, there has been a proposal in Japanese utility model application No. 58(1983)-5397, wherein a wire harness is attached in advance to a sealing sheet, which is mounted to the door frame, in order to reduce labor and time for wiring the door wire harness W within the door frame.

According to this method after the sealing sheet is attached to the door frame through its peripheral portion, connectors of the branch wires are connected to electric equipment within the door frame. Thereafter, connectors of the remaining branch wires are connected to electric equipment of the trim cover and at the same time, the trim cover is fixed to the door frame. In this case, connection of the branch wires in the production line of motor vehicles is left undone. Since the sealing sheet is formed of a soft synthetic resin material, much time is required to mount it, and usually requires specialized bonding means. It is also extremely difficult to maintain the shape of the sheet when it is stored or transported, often resulting in entangled branch wires. Also, retaining the wire harness merely by the sealing sheet is not sufficient, especially when it is used in circumstances under severe vibrations. Accordingly, it must be fixed to the door frame in advance, again requiring additional labor.

Another related art is disclosed in Japanese utility model early disclosure No. 56(1981)-97814, wherein one end portion of a conventional wire harness for a motor vehicle door is drawn out from the door through a grommet, reaches the vehicle body side from the door side by engagement with the respective holes, and connects to a cowl side harness within the vehicle body through a connector.

However, in the above-mentioned related art wherein the door wire harness is mounted to the door frame of a motor vehicle through the grommet, the end portion of the wire harness is thrusted through the thrusting hole formed in the door through the grommet, and thereafter, it is further required to be thrusted through another thrusting hole formed in the vehicle body side. Accordingly, this thrusting action and the requirement that it be performed twice, proves troublesome and, again, considerably slows down the production of motor vehicles in the production line thereof.

The present invention eliminates the above-mentioned inconveniences inherent in the prior art.

SUMMARY OF THE INVENTION

It is therefore an object of the present invention to provide a wire harness mounting structure for a motor vehicle door, wherein the door wire harness can be mounted easily and promptly in the production line of motor vehicles.

Another object of the present invention is to provide a wire harness mounting structure for a motor vehicle door, wherein the wire harness is flatly mounted to mounting means, including a covering board, so that it can be wired linearly and by way of the shortest distance.

A further object of the present invention is to provide a wire harness mounting structure for a motor vehicle door, wherein the branch wires of the wire harness are not entangled at the time when the mounting means, including the cover with the door wire harness attached thereto, is transported, stored and mounted to the door frame.

A still further object of the present invention is to provide a wire harness mounting structure for a motor vehicle door, wherein the door wire harness can be held in a stable position, even in circumstances where it is subject to severe vibration.

In order to achieve the above objects, there is essentially provided a wire harness mounting structure for a motor vehicle door comprising a door frame and planar mounting means detachably attached to said door frame at an internal side of the motor vehicle, having a wire harness mounted thereon, said means extending in a plane generally parallel to said door frame. The mounting means is either in the form of a covering board, or a combination of the covering board and an internal side board mounted between the vehicle door frame and the covering board, and is either integrally formed with the covering board, or rigidly formed independent of the board, as in the case of an internal side board.

The above and other objects and attendant advantages of the present invention will be apparent to those skilled in the art from a reading of the following description and claims, which in conjunction with the accompanying drawings, constitute part of this specification.

BRIEF DESCRIPTION OF THE DRAWINGS

FIG. 31 is an exploded perspective view of a modified embodiment of the harness of FIG. 26.

FIG. 33 is an exploded perspective view of a wire harness disposed on a covering board in relation to a motor vehicle door to which the board is to be mounted according to an eighth embodiment of the present invention.

DETAILED DESCRIPTION OF THE EMBODIMENTS

Figure 1:
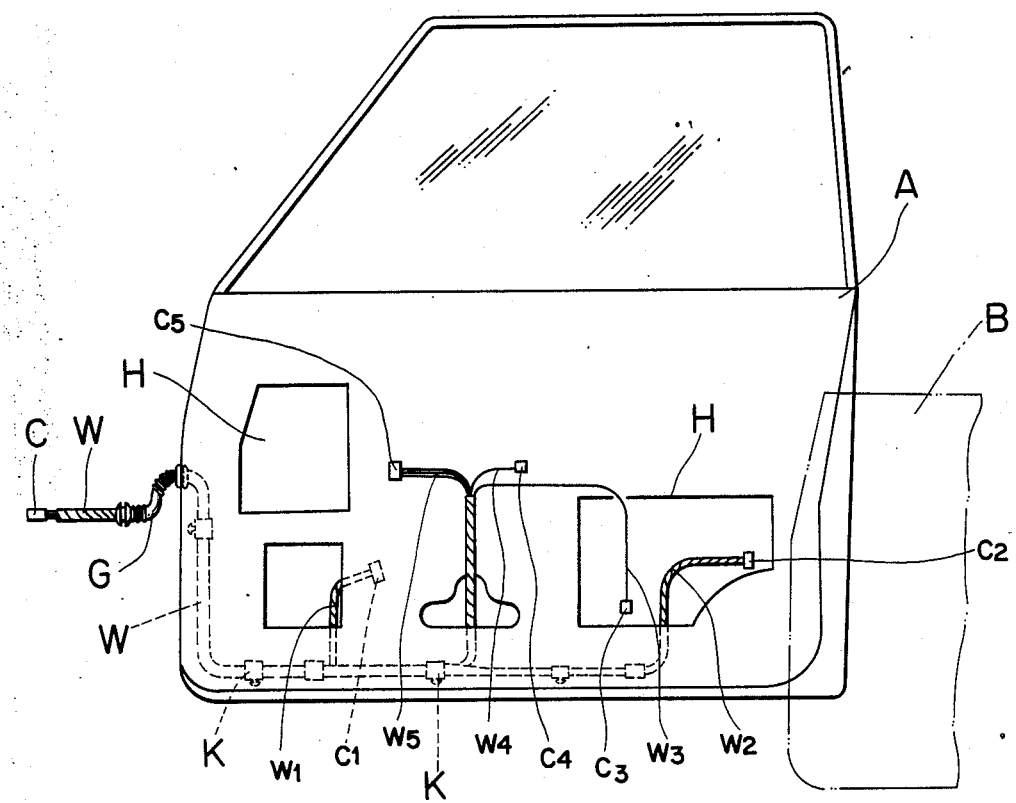
FIG. 1 is a schematic illustration of a conventional wire harness mounting structure for a motor vehicle door.

Preferred embodiments of the present invention will be described hereunder with reference to the accompanying drawings, wherein like reference numerals denote like or corresponding parts throughout several sheets of the drawings.

Figure 2:
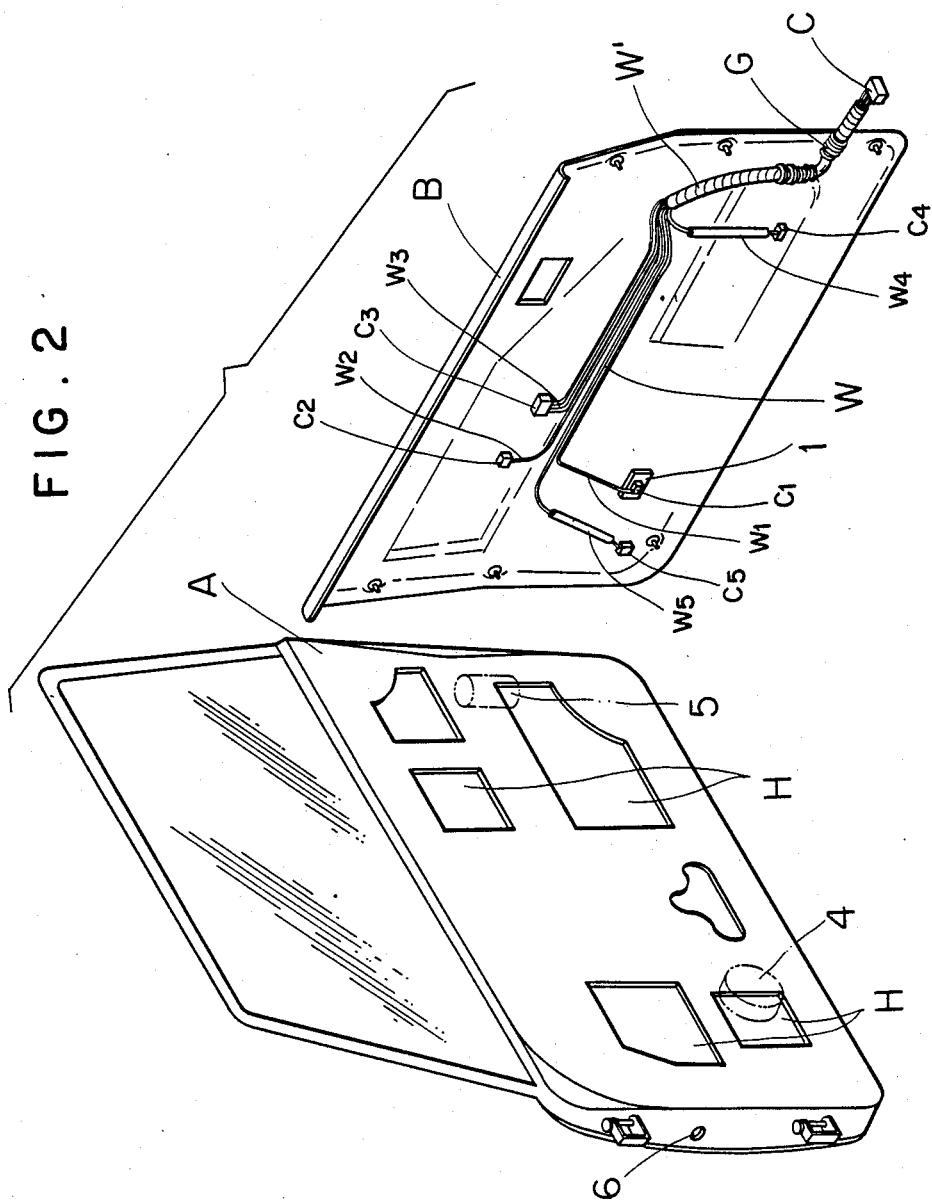
FIG. 2 is an exploded perspective view of a wire harness disposed on a covering board in relation to a motor vehicle door to which the board is to be mounted according to a first embodiment of the present invention.
Figure 3:
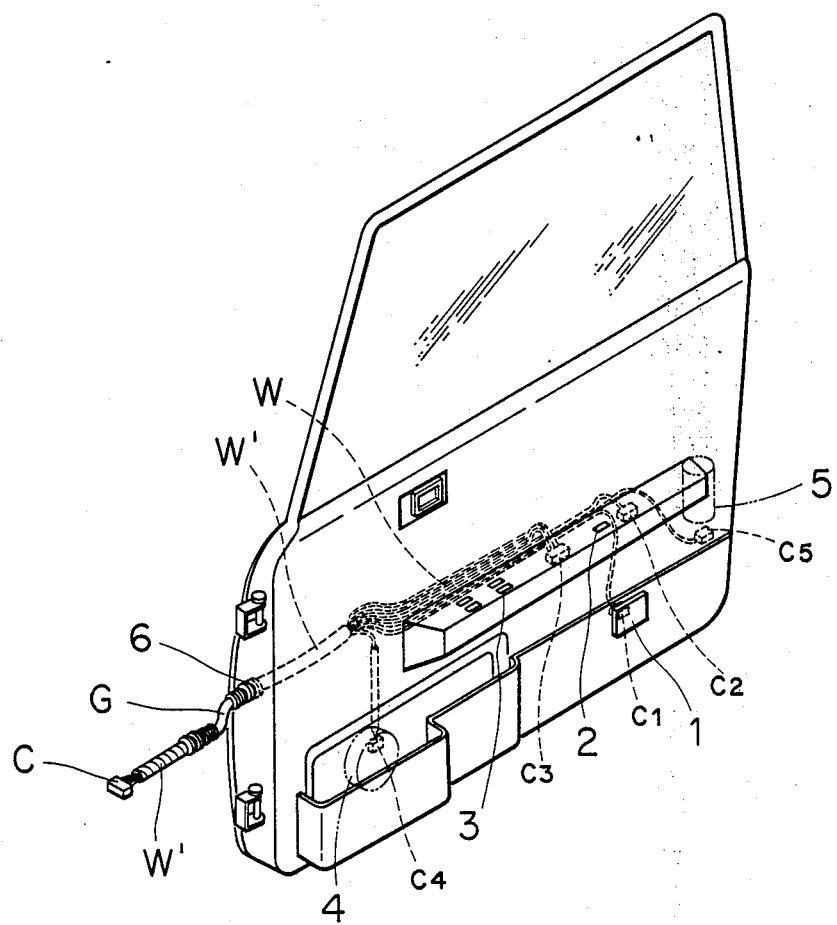
FIG. 3 is a perspective view showing the door wire harness of FIG. 2 on the covering board already mounted to the motor vehicle door.

Referring to FIGS. 2 and 3, a first embodiment of the invention will be described. In FIG. 2, A denotes a door frame for a motor vehicle door, and B denotes a covering board to be attached to the internal side thereof. The covering board B is provided with conductors for a door wire harness W flatly disposed thereon in parallel with one another by bonding agents, adhesive tapes, or other similar means.

The flatly disposed main section of the door wire harness is provided with branch wires w1, w2, w3, w4, w5... having at the end portions thereof connectors c1, c2, c3, c4, c5,... and is disposed in such a manner as to be separated from the covering board B. The door wire harness W is provided at its connecting end, toward a cowl side harness at a vehicle body side, with a bundled leading-out portion W'. The bundled leading-out portion W' is provided with a water proofing portion by a grommet G. The leading-out portion W' may be formed with a main connector C, and the connector may also serve as a water proofing portion.

The flat-shaped wire harness W may use elongated materials or rod materials other than normal electric wires. When the elongated materials or rod materials are used, they are connected to the branch wires w1, w2 ... and the electric wires of the bundled leading-out portion through terminals by welding or other similar means.

The covering board B is provided with electric equipment cartesi-lamp 1, trunk open switch 2, and power wind switch 3, to which the branch wires w1, w2 and w3 are connected in advance through the connectors c1, c2 and c3.

The covering board B in the foregoing state is combined with the door frame A of a motor vehicle in the production line, and the branch wires w4 and w5 are connected to a power wind motor 4 and an automatic door locking solenoid 5 within the door frame A through the connectors c4 and c5. At the same time, the water proofing portion, such as the grommet G in the bundled leading-out portion W', is put in alignment with leading-out hole 6. Thereafter, the covering board B is fixed to the door frame A.

The structure of the leading-out hole 6 is such that one side of the covering board B is partly cut out. It is also possible to push, therein, such a water-proofing portion as the grommet G etc., in the bundled leading-out portion W' from sideward of the leading-out hole 6.

Figure 4:
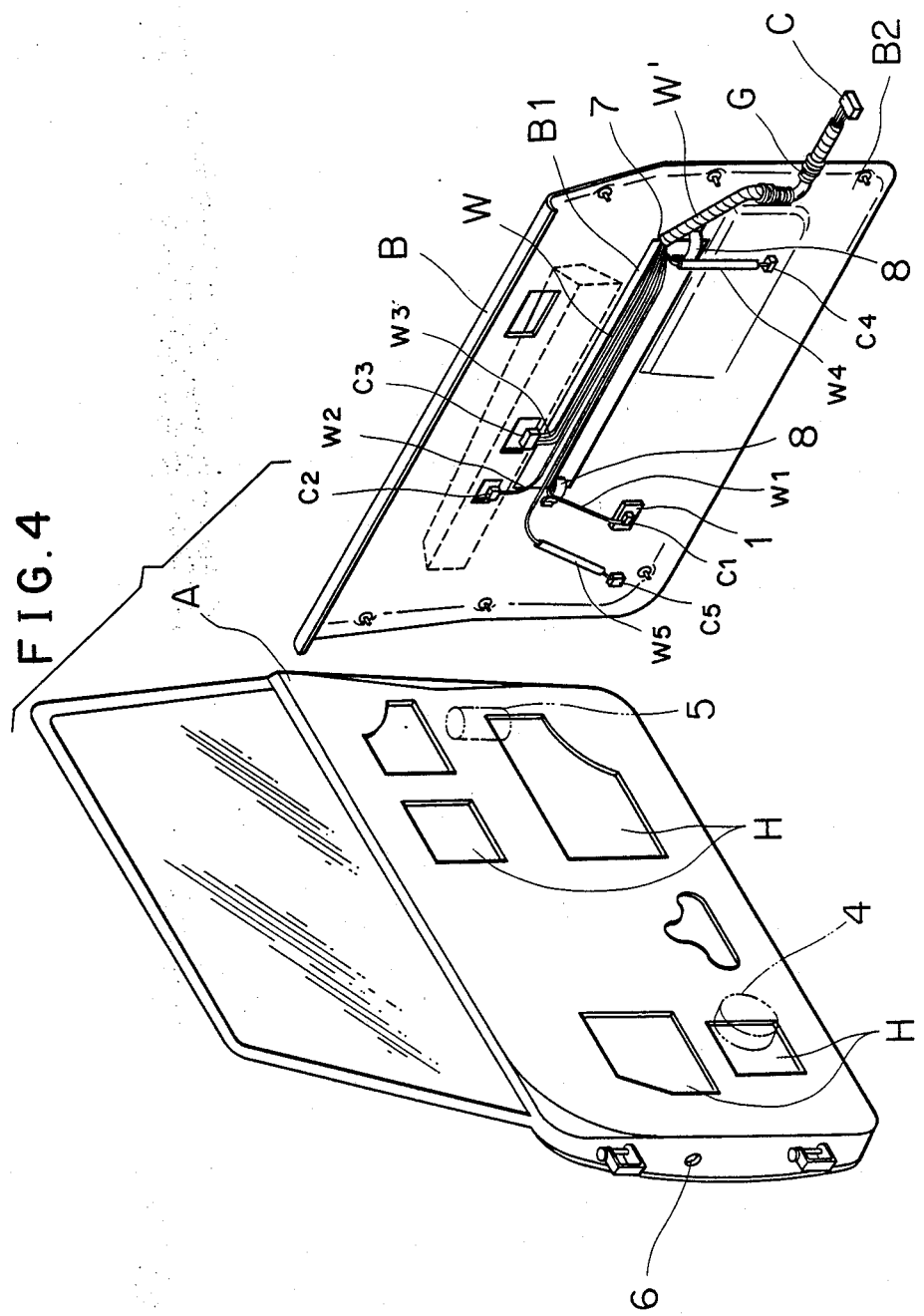
FIG. 4 is an exploded perspective view of a wire harness disposed on a covering board in relation to a motor vehicle door to which the board is to be mounted according to a second embodiment of the present invention.
Figure 5:
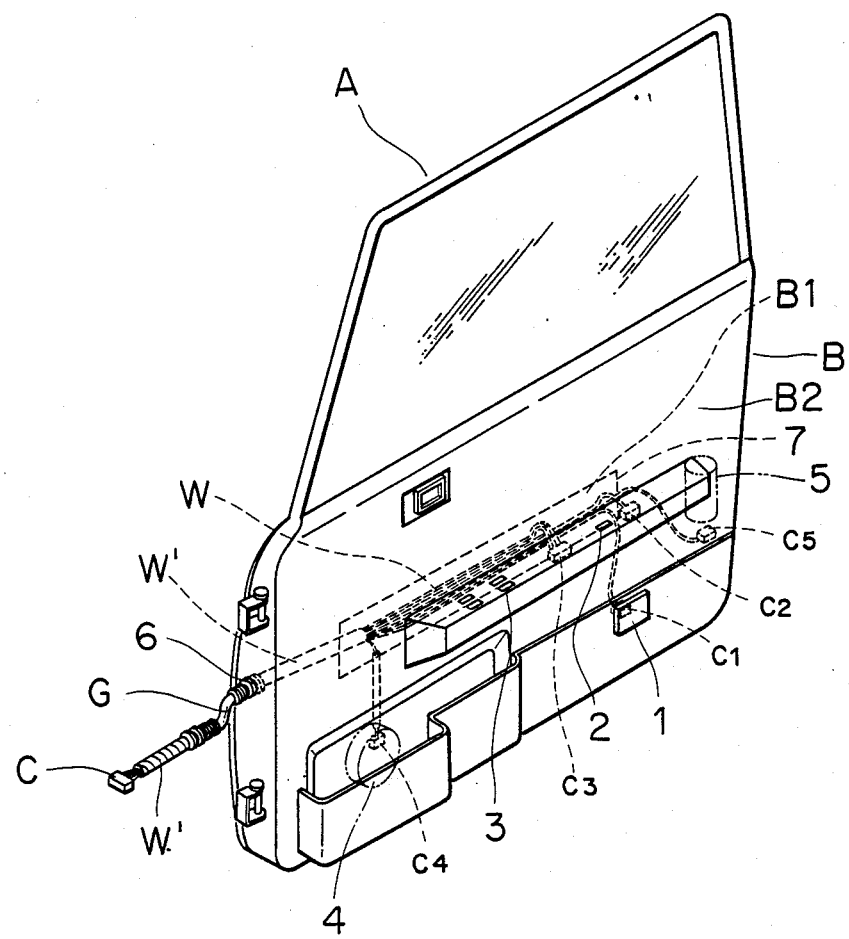
FIG. 5 is a perspective view showing the door wire harness of FIG. 4 on the covering board already mounted to the motor vehicle door.

Referring now to FIGS. 4 and 5, a second embodiment of the present invention will be described. In FIG. 4, A denotes a door frame in a motor vehicle door, and B denotes a covering board to be attached to the internal side thereof. The covering board B is divided into two portions; one is a wire harness wiring board section B1, and the other is a wire harness non-wiring board section B2. The wire harness wiring board portion B1 is provided with conductors for a door wire harness W flatly disposed thereon in parallel with one another by bonding agents, adhesive tapes, or other similar means.

The door wire harness flatly disposed is provided with branch wires w1, w2, w3, w4, w5... having at the end portions thereof connectors c1, c2, c3, c4, c5 ... and is disposed in such a manner as to be spaced apart from the wire harness wiring board section B1. The door wire harness W is provided at its connecting end, toward a cowl side harness at a vehicle body side, with bundled leading-out portion W'. The bundled leading-out portion W' is provided with a water proofing portion by a grommet G. The leading-out portion W' may be formed with a connector, and the connector can also be provided with a water proofing cover.

The flat-shaped wire harness W may use elongated materials or bar materials other than normal electric wires. When the elongated materials or bar materials are used, they are connected to the branch wires w1, w2 ... and the electric wires of the bundled leading-out portion through terminals by welding or other similar means.

The wire harness wiring board portion B1 is engaged in a hole 7 formed in the wire harness non-wiring board portion B2, and fixed thereto by a fixture 8.

The covering board B is provided with electric equipment cartesi-lamp 1, trunk opening switch 2, and power wind switch 3, to which the branch wires w1, w2 and w3 are connected in advance through the connectors c1, c2 and c3.

The covering board B in the foregoing state is combined with the door frame A of a motor vehicle in the production line of motor vehicles, and the branch wires w4 and w5 are connected to a power wind motor 4 and an automatic door locking solenoid 5 within the door frame A through the connectors c4 and c5. At the same time, a water proofing portion, such as the grommet G in the bundled leading-out portion W' is put in alignment with leading-out hole 6. Thereafter, the covering board B is fixed to the door frame A.

Figure 6:
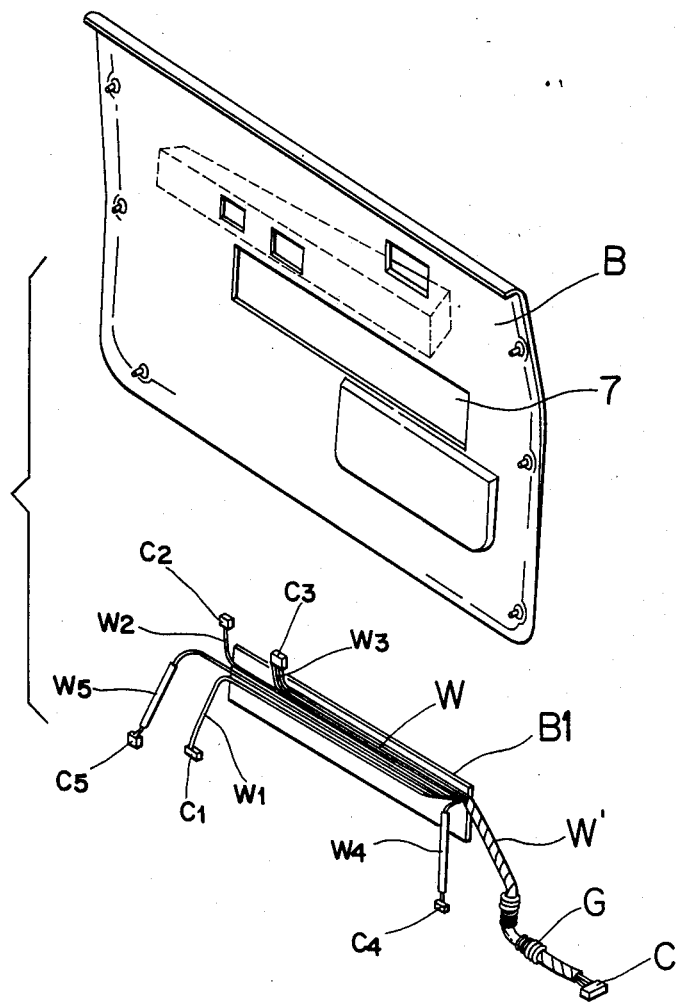
FIG. 6 is an exploded perspective view of a wire harness disposed on a wire harness wiring board in relation to a motor vehicle door to which the board is to be mounted according to a third embodiment of the present invention.
Figure 7:
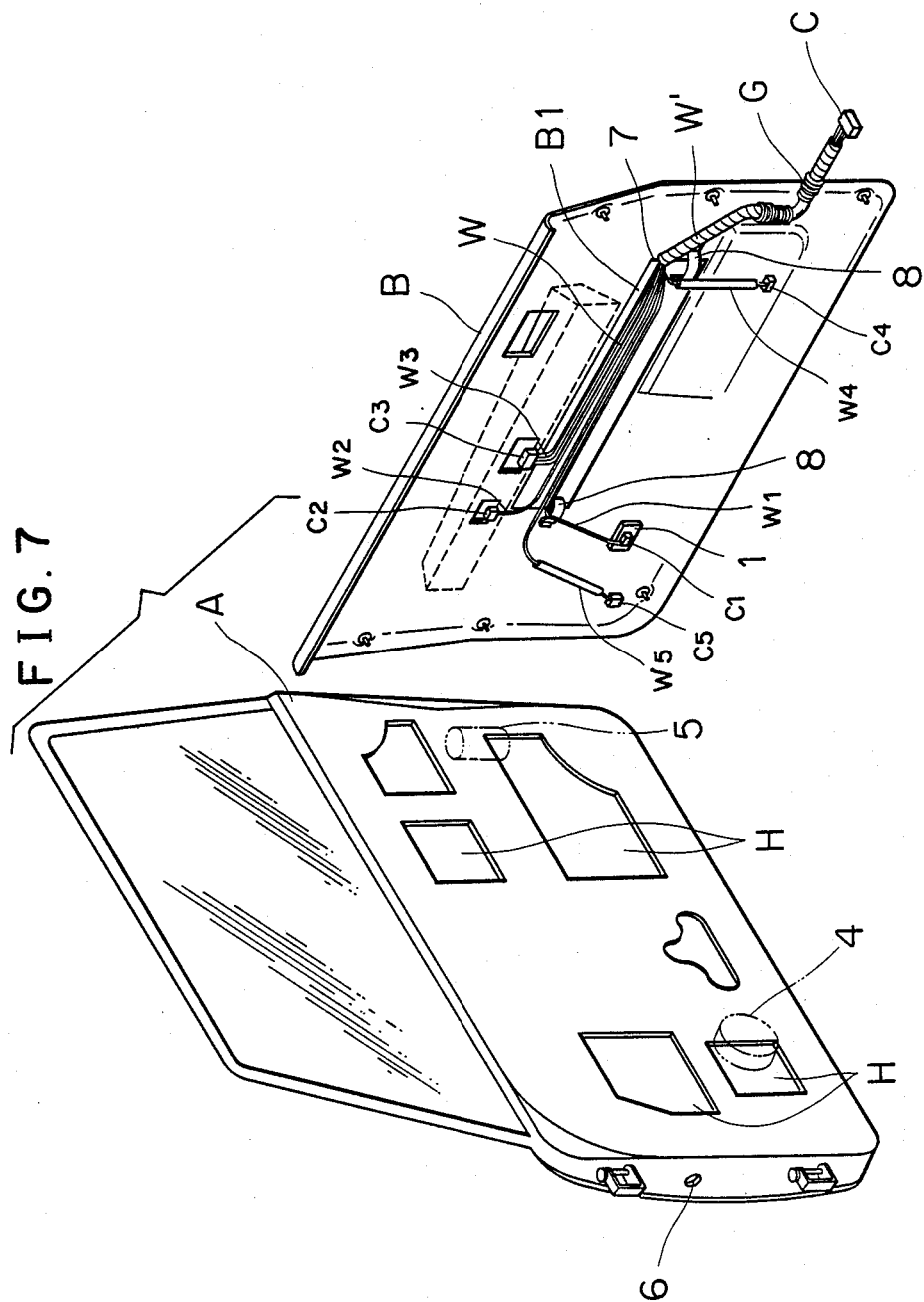
FIG. 7 is an exploded perspective view showing the door wire harness of FIG. 6 on the wiring board already mounted to the covering board.
Figure 8:
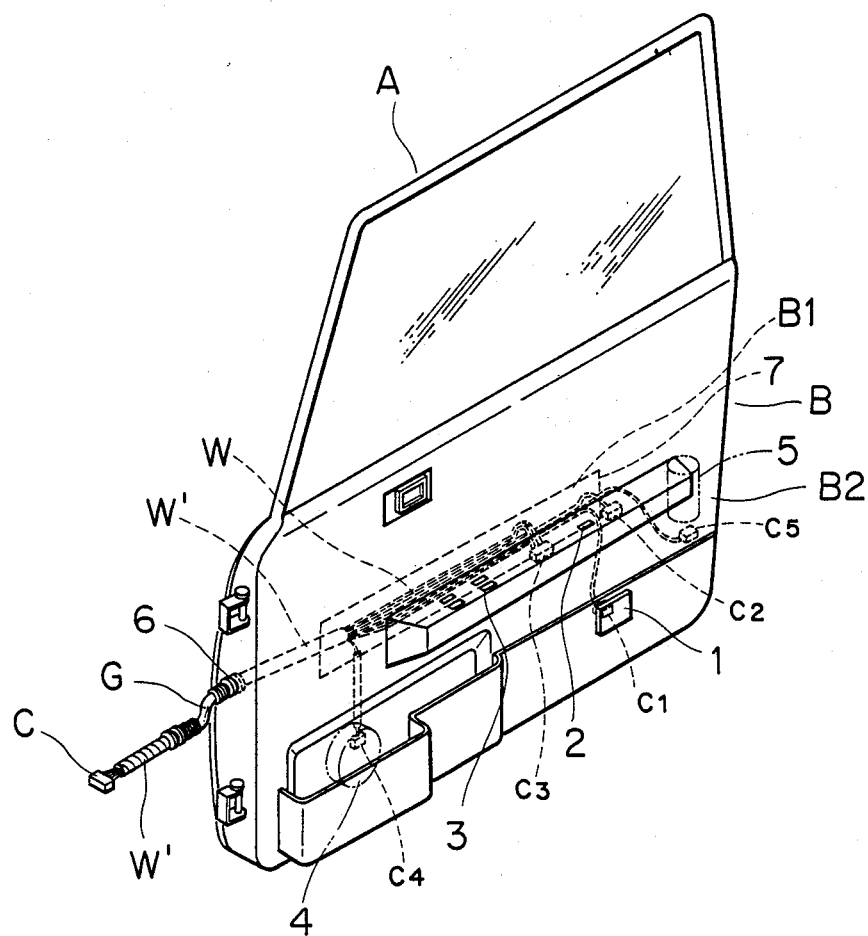
FIG. 8 is a perspective view of the covering board of FIG. 7 already mounted to the door frame.

Referring now to FIGS. 6 through 8, a third preferred embodiment of the invention will be described. In FIG. 6, the wire harness wiring board section B1 is provided with conductors for a door wire harness W flatly disposed thereto in parallel with one another by bonding agents, adhesive tapes, or other similar means.

The flatly disposed main section of the door wire harness is provided with branch wires w1, w2, w3, w4, w5... having at the end portions thereof connectors c1, c2, c3, c4, c5,..., and is disposed in such a manner as to be spaced apart from the wire harness wiring board section B1. The door wire harness W is provided at its connecting end toward a cowl side harness at a vehicle body side, with bundled leading-out portion W'. The bundled leading-out portion W' is provided with a water proofing portion by a grommet G.

The flat-shaped wire harness W may use elongated materials or bar materials other than normal electric wires. When the elongated materials or bar materials are used, they are connected to the branch wires w1, w2 ... and the electric wires of the bundled leading-out portion W' through terminals by welding or other similar means.

In this embodiment, the wire harness wiring board section B1 is engaged in a hole 7 formed in the covering board B, which is to be attached to the internal side of a motor vehicle door, and fixed thereto by a fixture 8 (FIG. 7).

The covering board B is provided with electric equipment cartesi-lamp 1, trunk opening switch 2, and power wind switch 3, to which the branch wires w1, w2 and w3 are connected in advance through the connectors c1, c2 and c3.

The covering board B in the foregoing state is combined with the door frame A of a motor vehicle in the production line of motor vehicles, and the branch wires w4 and w5 are connected to a power wind motor 4 and an automatic door locking solenoid 5 within the door frame A through the connectors c4 and c5. At the same time, a water proofing portion, such as the grommet G in the bundled leading-out portion W', is put in alignment with leading-out hole 6. Thereafter, the covering board B is fixed to the door frame A (FIG. 8).

Figure 9:
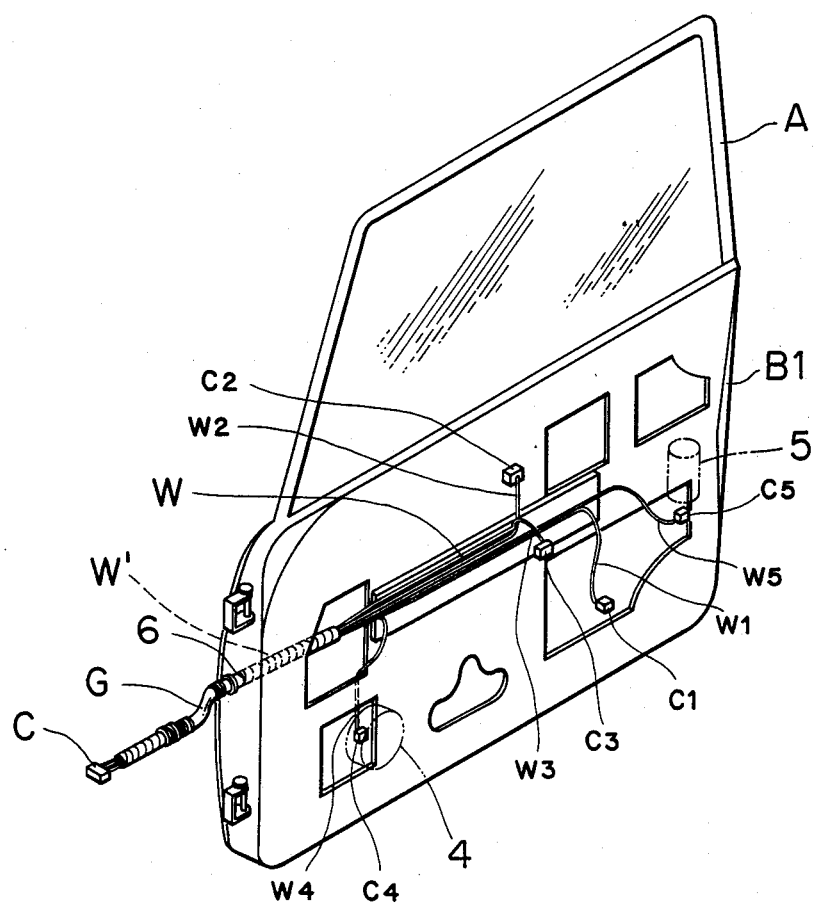
FIG. 9 is a perspective view of a modified embodiment of the above, wherein the wiring board is directly mounted to the door frame.
Figure 10:
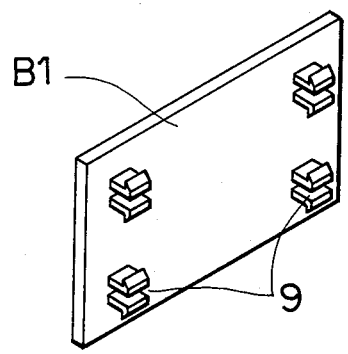
FIG. 10 is a perspective view of the wiring board of FIG. 9 when viewed from the back thereof.

FIGS. 9 and 10 illustrate a modified embodiment of the wiring board. In this modified embodiment, a wire harness wiring board section B1 is fixed to the internal side of the door frame A. In this case, the wire harness wiring board section B1, made of a synthetic resin material, is integrally formed at its rear surface with a plurality of elastic retaining nails 9 as shown in FIG. 10. By inserting the elastic retaining nails 9 in retaining holes formed at predetermined positions in the door frame A in advance, the wire harness wiring board section B1 can be mounted to the door frame A easily and rapidly.

For water-proofing purposes, the wire harness wiring board section B1 may be fixed to a synthetic resin sheet interposed between the door frame A and the covering board B by bonding means.

Figure 11:
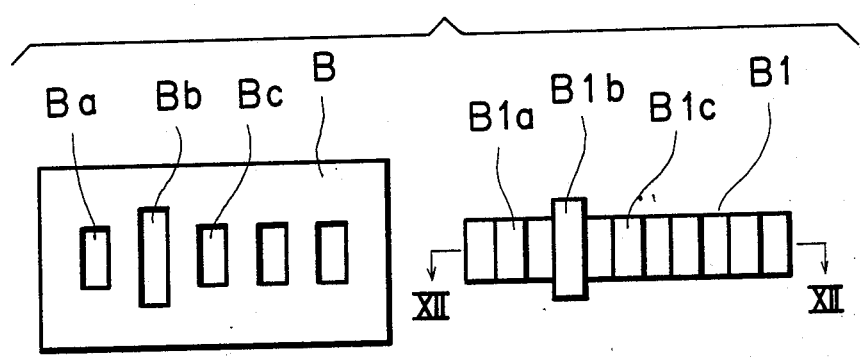
FIG. 11 is an exploded front view of a further modified embodiment.
Figure 12:
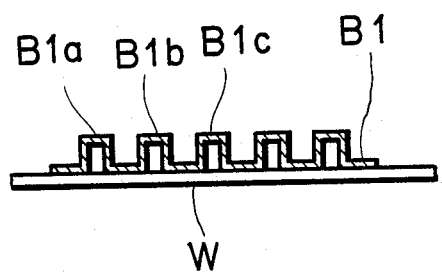
FIG. 12 is a sectional view taken on line XII—XII of FIG. 11.

FIGS. 11 and 12 illustrate another modified embodiment of the wiring board, wherein a wire harness wiring board section B1 is provided with a plurality of knobs B1a, B1b, B1c... B1n, and the covering board B is formed with a plurality of retaining holes Ba, Bb, Bc, Bn corresponding to the knobs B1a, B1b, B1c... B1n. The wire harness wiring board section B1 with the wire harness flatly disposed thereon in advance is fixed by means of engagement between the knobs B1a... B1n and the retaining holes Ba-Bn.

Figure 13:
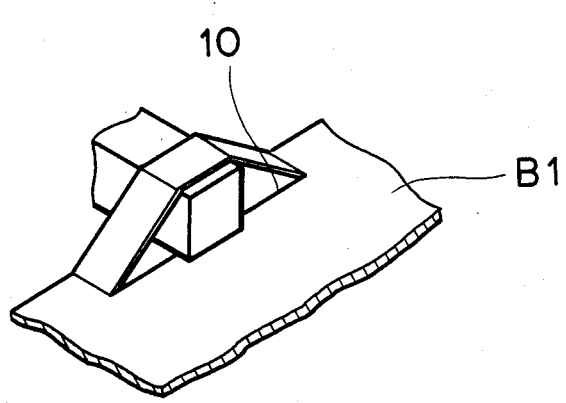
FIG. 13 is a perspective view of a still further modified embodiment.

In a still further modified embodiment shown in FIG. 13, the wire harness wiring board section B1 is formed of a thin plate made of a synthetic material. In this modified embodiment, the wire harness wiring board section B1 is formed with a slit 10 which suitably fits with an uneven portion at a location where the board portion B1 is to be placed.

Figure 14:
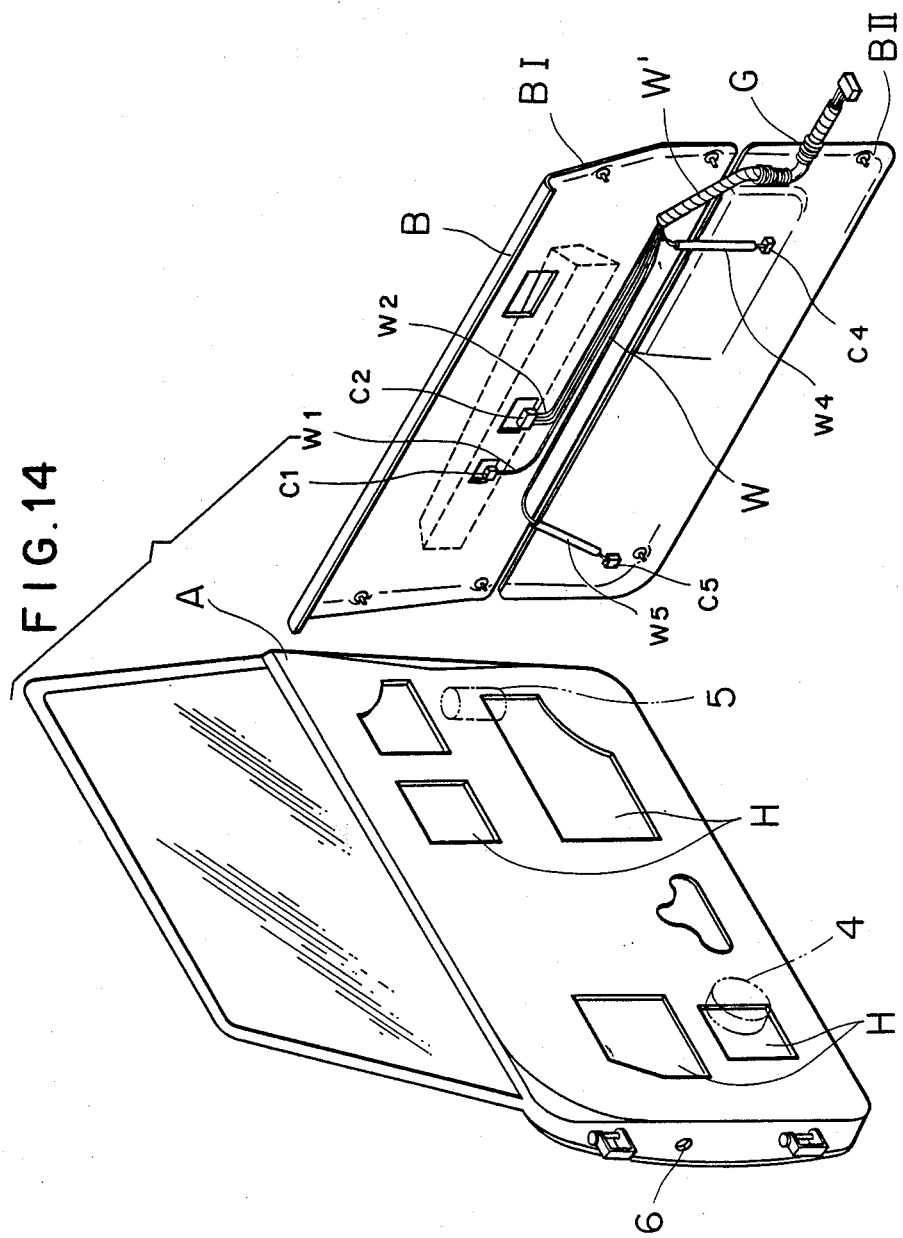
FIG. 14 is an exploded perspective view of a wire harness disposed on a covering board formed of an electric equipment mounting board section and an electric equipment non-mounting board section in relation to a motor vehicle door to which the board is to be mounted according to a fourth embodiment of the present invention.
Figure 15:
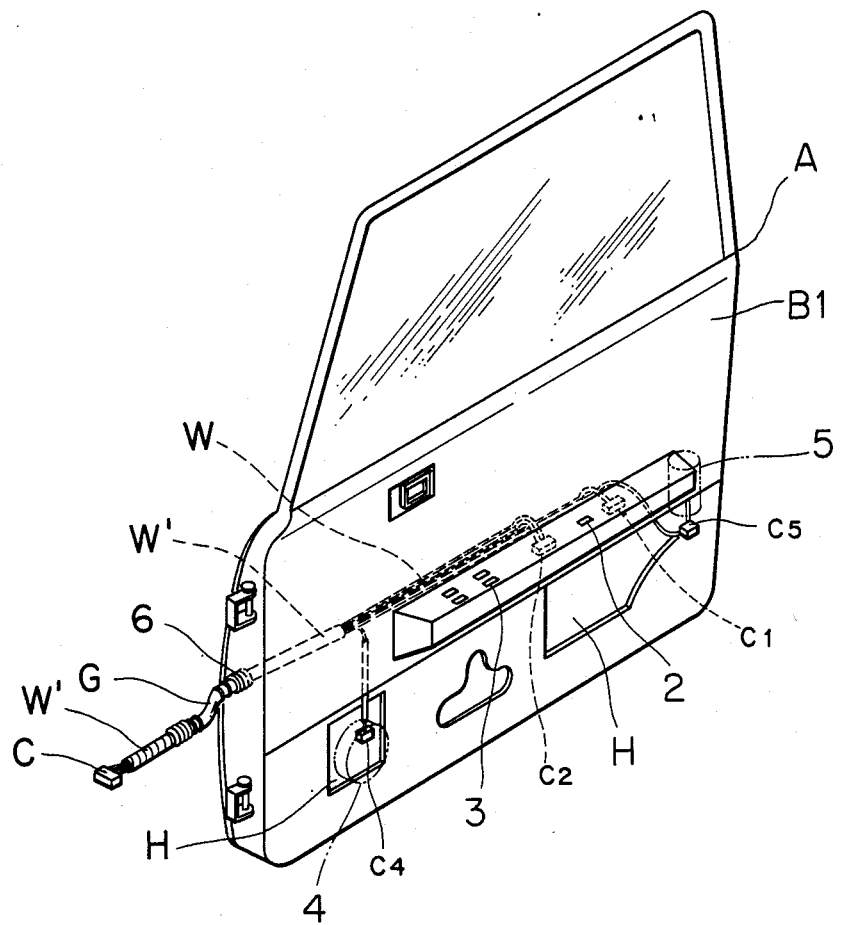
FIG. 15 is a perspective view showing one stage of the mounting process of FIG. 14.
Figure 16:
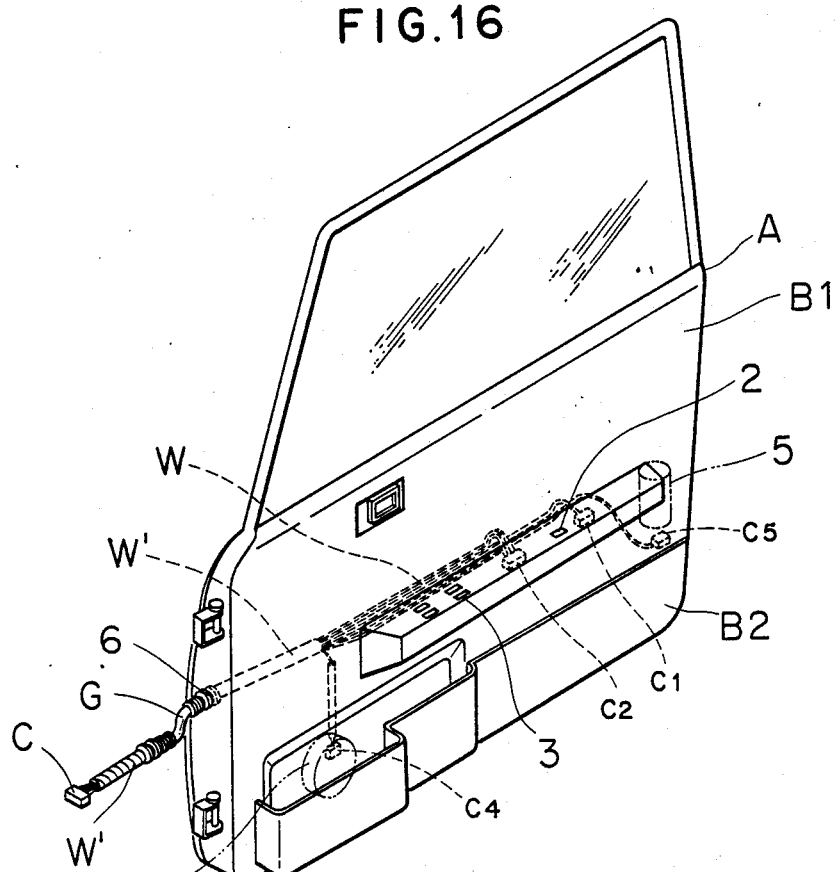
FIG. 16 is a perspective view showing the mounting work.

Referring now to FIGS. 14 and 16, a fourth embodiment of the present invention will be described. In FIG. 14, A denotes a door frame in a motor vehicle door, and B denotes a covering board to be attached to the internal side thereof. The covering board B is divided into two portions; one is an electric equipment mounting board section BI and the other is an electric equipment non-mounting board section BII. The upper electric equipment mounting board section BI is provided with conductors for a door wire harness W flatly disposed thereon in parallel with one another by bonding agents, adhesive tapes, or other similar means.

The door wire harness W flatly disposed is provided with branch wires w1, w2, w3, w4, w5... having at the end portions thereof connectors c1, c2, c3, c4, c5..., and is disposed in such a manner as to be spaced apart from the electric equipment mounting board section BI. The door wire harness W is provided at its connecting end, toward a cowl side harness at a vehicle body side, with a bundled leading-out portion W'. The bundled leading-out portion W' is provided with a water proofing portion G such as a grommet. The leading-out portion W' may be formed with a connector, which can also be provided with a water proofing cover.

The flat-shaped wire harness W may use elongated materials or bar materials other than normal electric wires. When the elongated materials or bar materials are used, they are connected to the branch wires w1, w2 and the electric wires of the bundled leading-out portion through terminals by welding or other similar means.

The electric equipment mounting board section BI is provided with a trunk opening switch 2, and a power wind switch 3, to which the branch wires w2 and w3 are connected in advance through the connectors c2 and c3.

The electric equipment mounting board section BI in the foregoing state is combined with the door frame A of a motor vehicle in the production line, and the branch wires w4 and w5 are connected to a power wind motor 4 and an automatic door locking solenoid 5 within the door frame A from working windows H, through the connectors c4 and c5. At the same time, the water proofing portion, such as the grommet G in the bundled leading-out portion W', is put in alignment with leading-out hole 6. Thereafter, the electric equipment mounting board section BI is fixed to the door frame A. Then, the working windows H are shut by fixing the electric equipment non-mounting board section BII to the door frame A.

Figure 17:
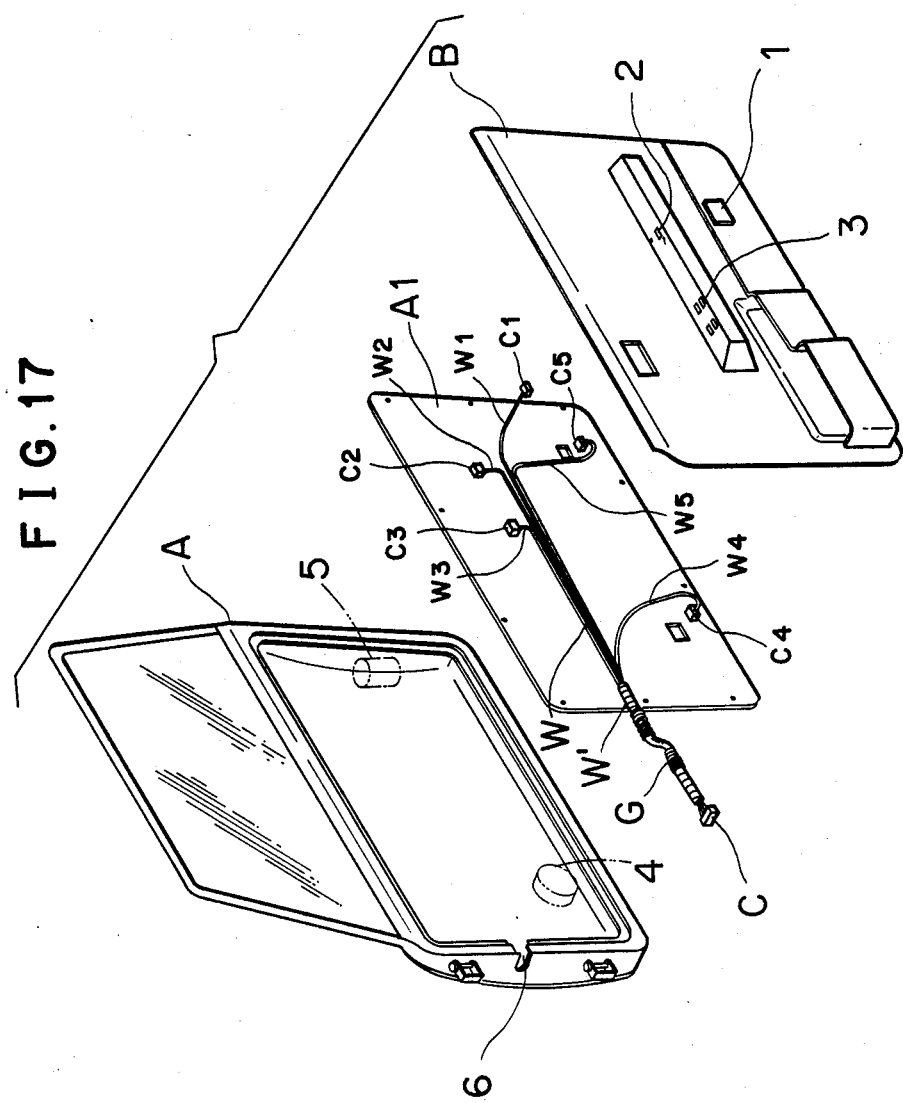
FIG. 17 is an exploded perspective view of a wire harness disposed on an internal side board in relation to a covering board and a motor vehicle door to which the side board is to be mounted according to a fifth embodiment of the present invention.
Figure 18:
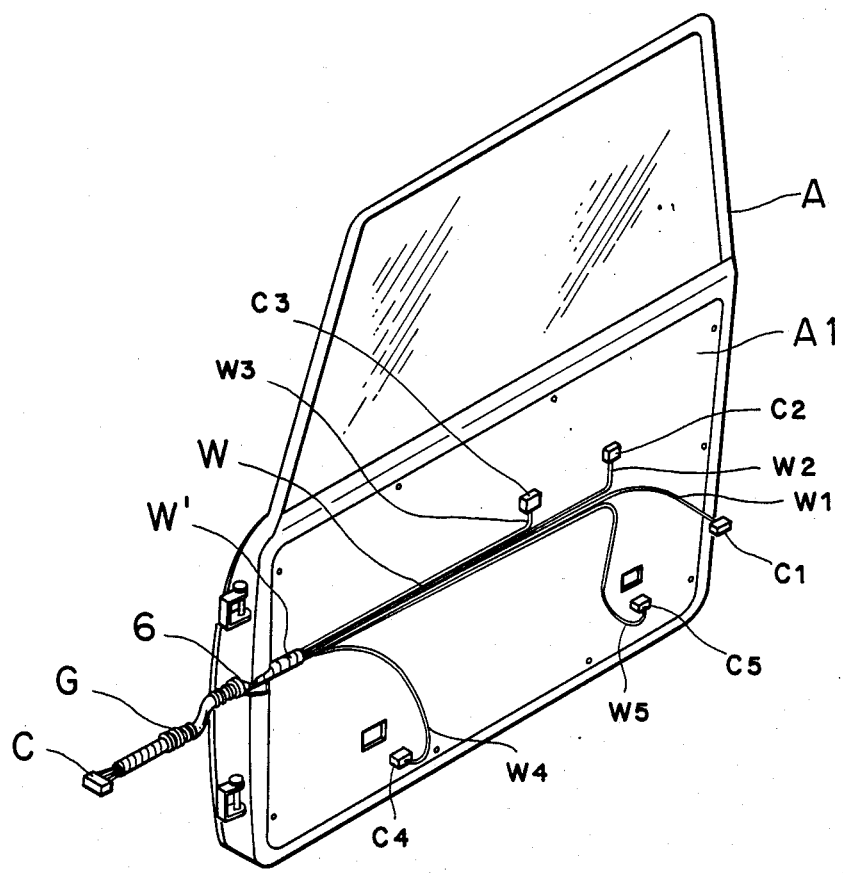
FIG. 18 is a perspective view of the internal side board already mounted to the door frame.

Referring now to FIGS. 17 and 18, a fifth embodiment of the present invention will be described. In FIG. 17, A denotes a door frame in a motor vehicle door, and B denotes a covering board to be attached to the internal side thereof. The door frame A has a separated internal side board portion A1.

The internal side board section A1 is formed of a metallic or synthetic resin material. The internal side board section A1 is provided at its one side surface with the respective conductors for a main wire portion of a door wire harness W, flatly attached thereto in parallel with one another by bonding agents, adhesive tapes, or other similar means.

The door wire harness W flatly disposed is provided with branch wires w1, w2, w3, w4, w5... having at end portions thereof connectors c1, c2, c3, c4, c5... and is disposed in such a manner as to be spaced apart from the internal side board section A1. The door wire harness W is provided at its connecting end, toward a cowl side harness at a vehicle body side, with a bundled leading-out portion W'. The bundled leading-out portion W' is provided with a water proofing portion G, such as a grommet. The leading-out portion W' may be formed with a connector which can also be provided with a water proofing cover.

The flat-shaped wire harness W may use elongated materials or bar materials other than normal electric wires. When the elongated materials or bar materials are used, they are connected to the branch wires w1, w2..., and the electric wires of the bundled leading-out portion through terminals by welding or other similar means.

The covering board B is provided with a cartesi-lamp 1, a trunk opening switch 2, and a power wind switch 3, and the door frame A is provided at its inside with a power wind motor 4 and an automatic door solenoid 5.

The internal side board portion A1 in the foregoing state is combined with the door frame A of a motor vehicle in the production line of motor vehicles, and the branch wires w4 and w5 are connected to a power wind motor 4 and an automatic door locking solenoid 5 within the door frame A from working windows H through the connectors c4 and c5. At the same time, a water-proofing portion such as the grommet G, in the bundle leading-out portion W' is put in alignment with leading-out hole 6. Thereafter, while the branch wires w1, w2 and w3 are being connected to the cartesi-lamp 1, trunk opening switch 2, and power wind switch 3, the covering board B is fixed to the door frame A. At this time, the leading-out hole 6 is shut by the covering board B. In this embodiment, the internal side board portion A, is detachably mounted on the door frame A. However, said internal side board portion A, may be integral to the door frame A.

Figure 19:
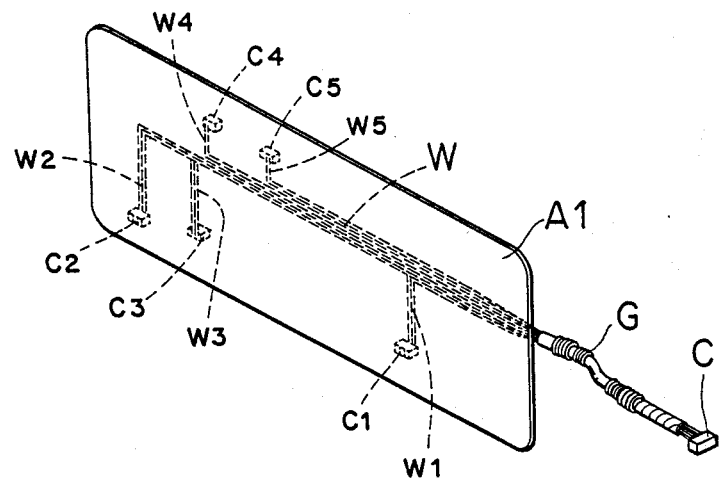
FIG. 19 is a perspective view showing a modification of the above internal side board.

In a modified embodiment as shown in FIG. 19, the door wire harness W and the branch wires w1 through w5 use an elongated material or bar material, and are integrally molded to the inside of the internal side board section A1 which is made of a synthetic resin material. The connectors c1 through c5, at the end portions of the respective branch wires w1 through w5, are connected to both sides of the internal side board section A1 in such a manner as to be facing outward.

Figure 20:
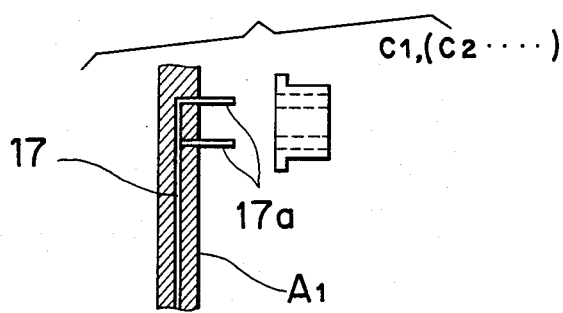
FIG. 20 is a detailed illustration showing a connector portion of FIG. 19.

As shown in FIG. 20, the end portion 17a of each of the elongated materials 17 is bent and projected outward from the outer surface of the internal side board section A1. Accordingly, by combining the connectors c1, etc. thereto, they function as terminal metal pieces.

In the above case, the connectors which are to be interconnected to the electric equipment within the door frame and the covering board B are located in opposite relation. Accordingly, the above-mentioned electric equipment is immediately connected through the connectors at the time when the internal side board A1 or the covering board B is mounted to the door frame.

Figure 21:
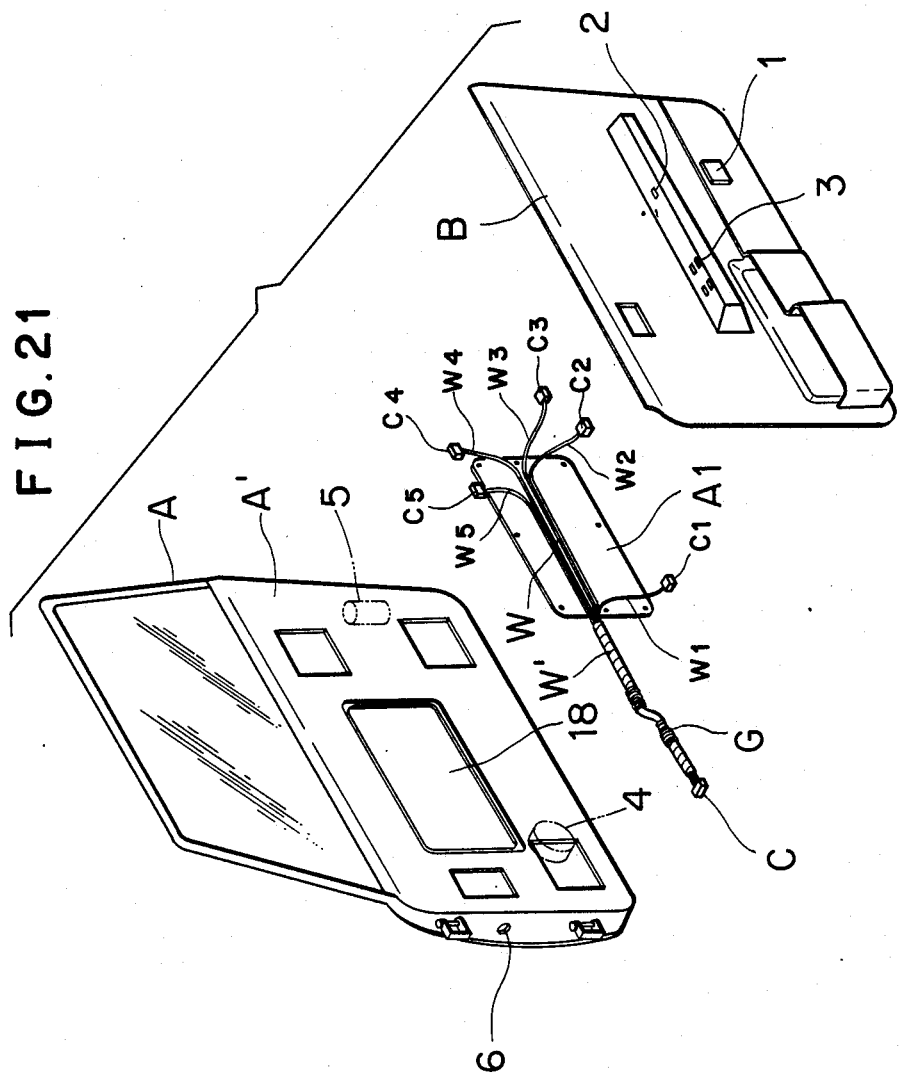
FIG. 21 is an exploded perspective view showing a further modified embodiment of the internal side board.
Figure 22:
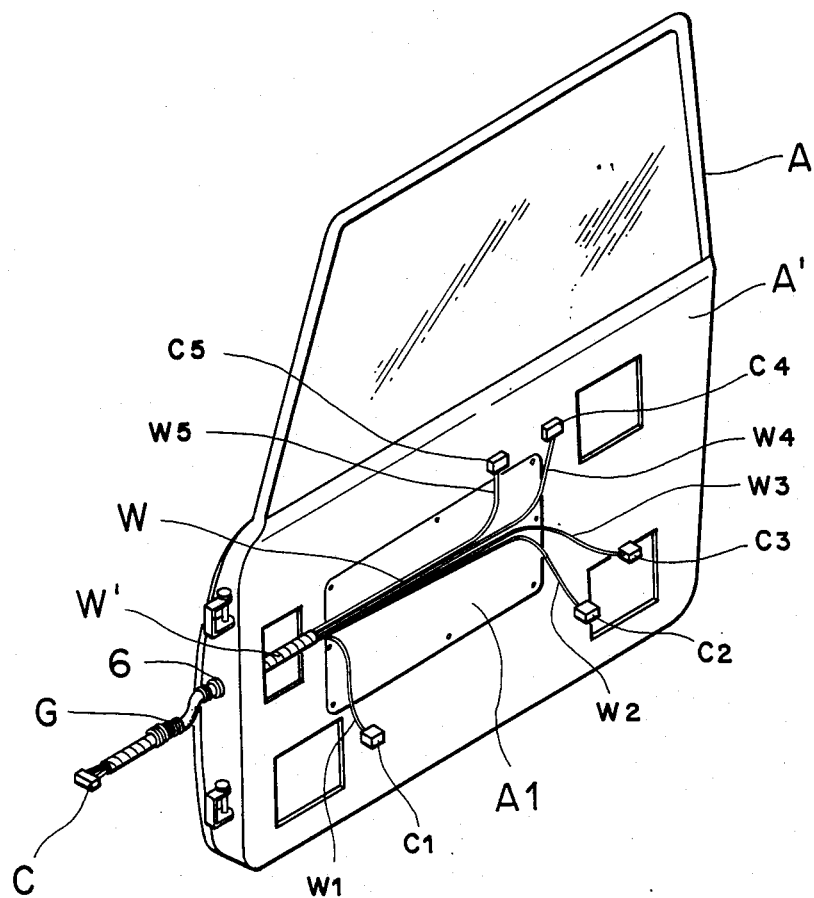
FIG. 22 is a perspective view of the above modified internal side board already mounted to the door frame.

According to a modified embodiment in FIG. 21, the internal side board section A' of the door frame A is integrally formed in the same manner as the conventional art. In this embodiment, a smaller internal side board section A1 is fixed to the outer surface of the internal side board section A'. The smaller internal side board section A1 is attached with the door wire harness W in the same manner as in the preceding embodiment. The wire harness W has branch wires w1 through w5 provided at the end portions thereof with connectors c1 through c5.

The internal side board section A' is formed with a cut-out portion 18 for receiving the smaller internal side board section A1 therein.

Figure 23:
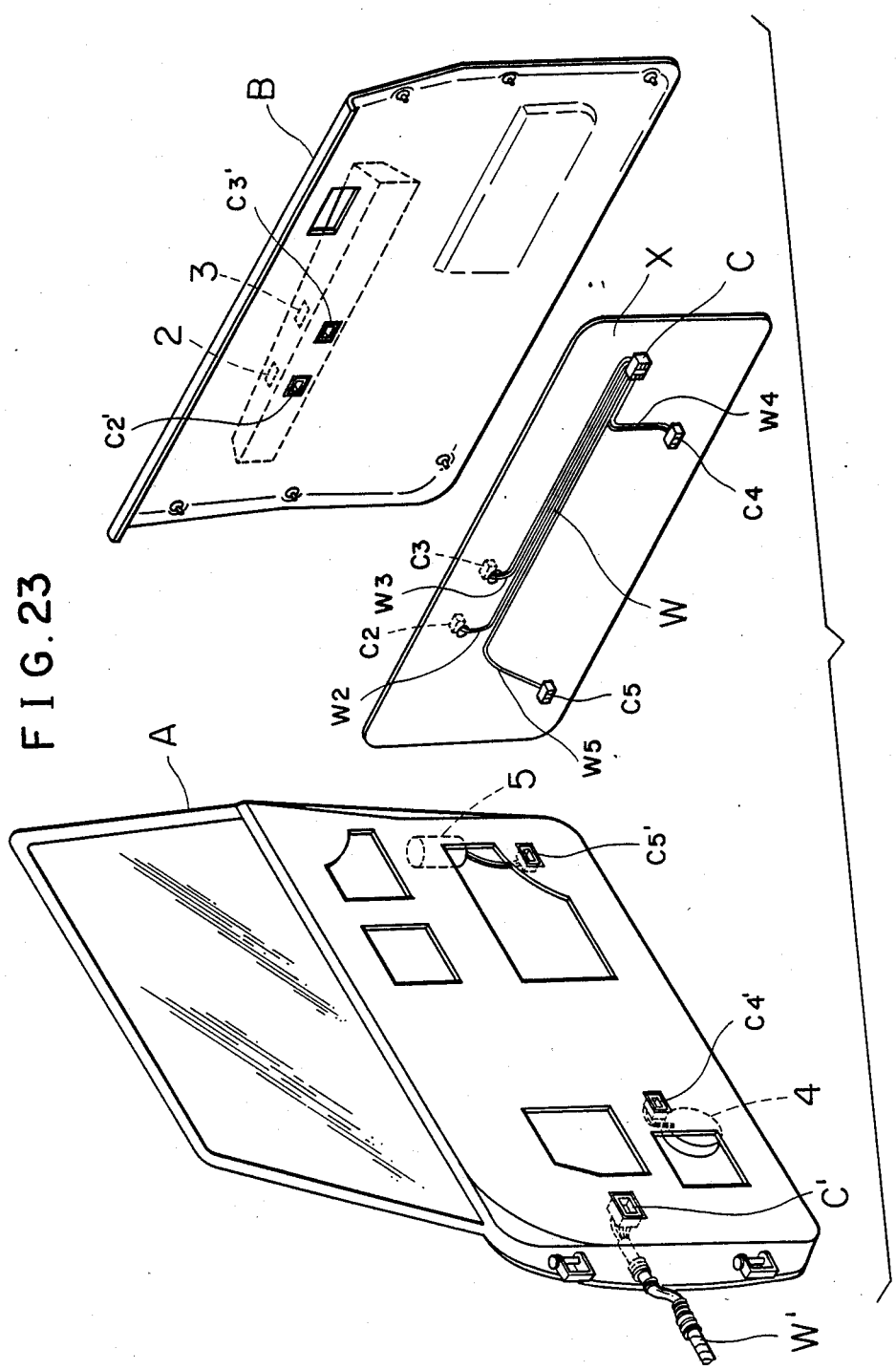
FIG. 23 is an exploded perspective view according to a sixth embodiment of the present invention, of a wire harness disposed on a mounting board in relation to a covering board and a motor vehicle door to which the mounting board is to be mounted.
Figure 24:
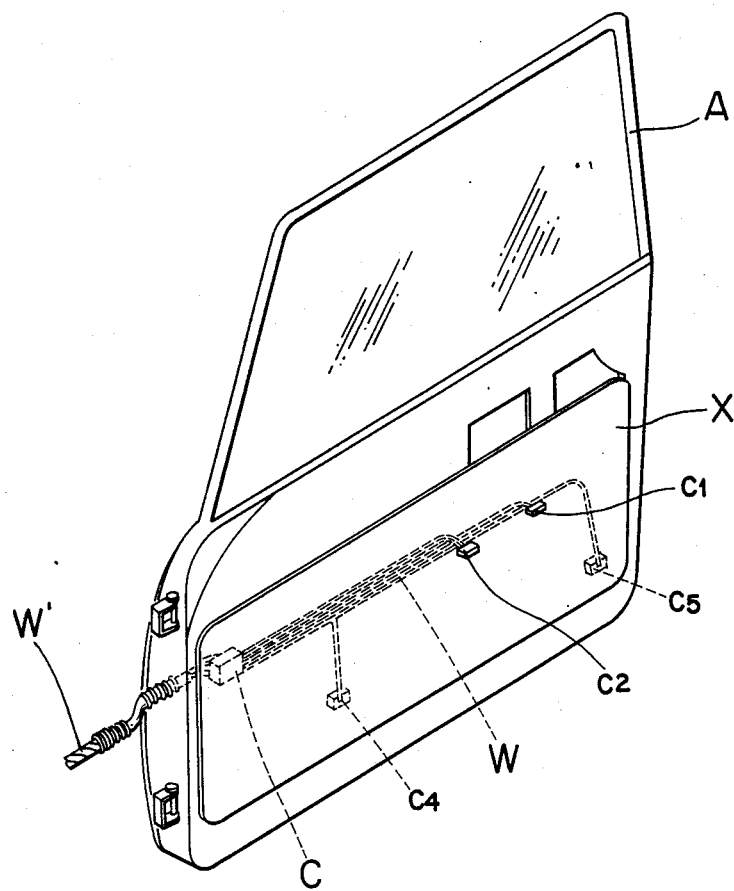
FIG. 24 is a perspective view of the mounting board of FIG. 23 already mounted to the door frame.
Figure 25:
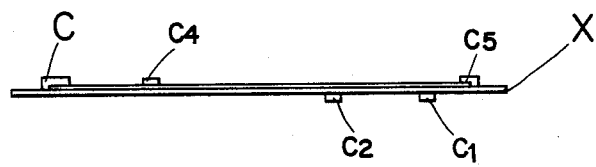
FIG. 25 is a plan view of the mounting board of FIG. 23.

Referring now to FIGS. 23 and 25, a sixth embodiment of the present invention will be described. In FIG. 23, a mounting board X is provided at its one surface with the respective conductors for a door wire harness W flatly disposed thereon in parallel with one another by bonding agents, adhesive tapes, or other similar material. At the same time, the mounting board X is firmly attached with a main connector C at one end portion of the door wire harness W, and also with connectors c1 and c2 of branch wires w1 and w2 with the connecting portions thereof facing outward with respect to the door frame A. On the other hand, the mounting board X is firmly attached at its other surface with connectors c3 and c4 of branch wires w3 and w4 facing outward with respect to the covering board.

The door frame A is firmly attached at its internal surface with a connector C' at an end portion of a cowl side harness W' from the vehicle body, a connector c4 for a power wind motor 4 and a connector c5 for an automatic door locking solenoid 5 disposed at predetermined positions. The covering board B is firmly attached at its rear surface with a connector c2' for a trunk opening switch 2 and a connector c3' for a power wind switch 3 disposed at predetermined positions.

The mounting board X in the foregoing state is firmly attached to a predetermined position on the door frame A by suitable retaining means. At the same time, the corresponding connectors are inter-connected respectively. Thereafter, the covering board B is mounted to the door frame A and the remaining connectors c3 and c3', and c4 and c4' are interconnected, respectively.

Figure 26:
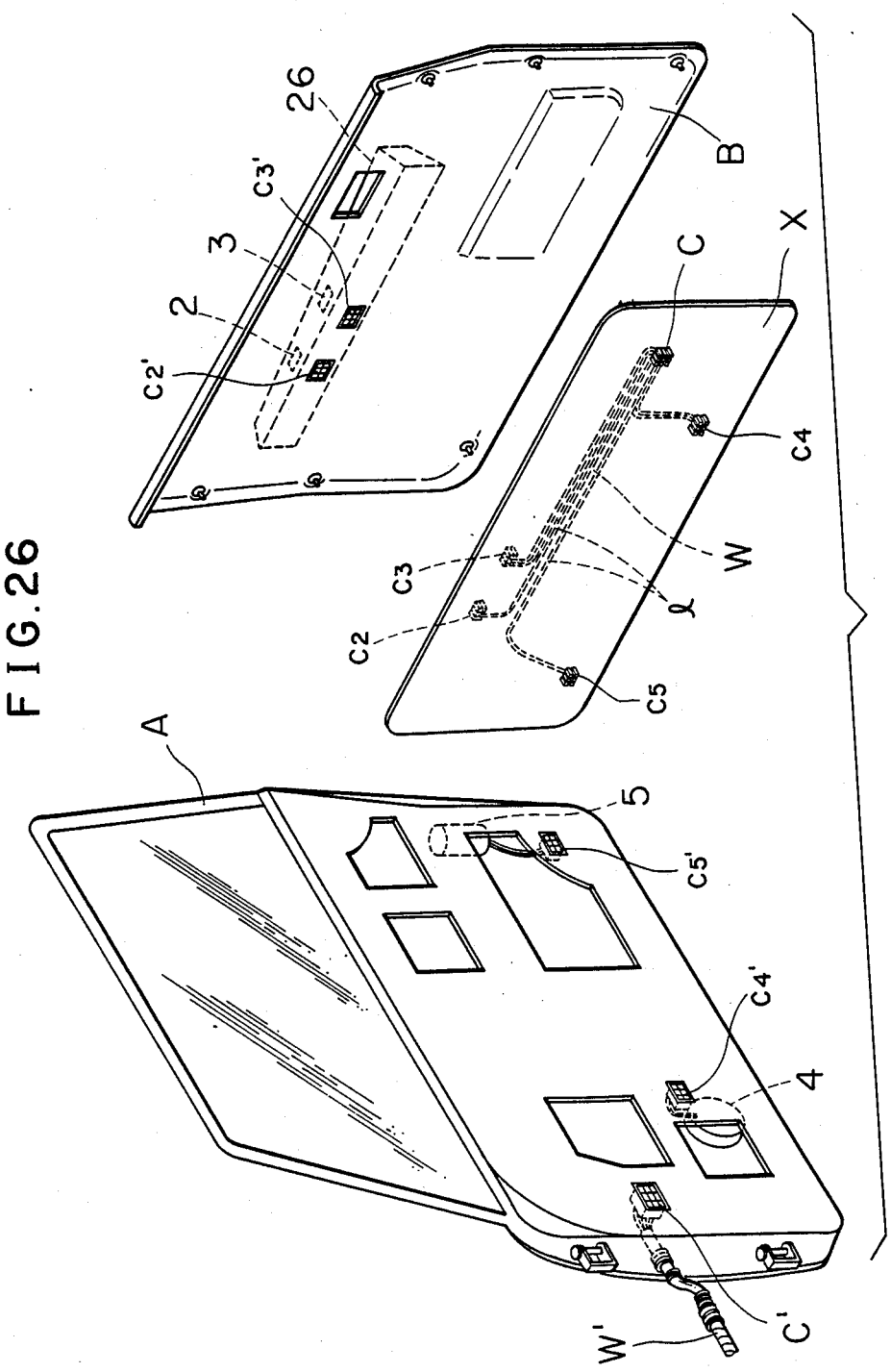
FIG. 26 is an exploded perspective view according to a seventh embodiment of the present invention, of a wire harness disposed on a mounting board in relation to a covering board and a motor vehicle door to which the mounting board is to be mounted.
Figure 27:
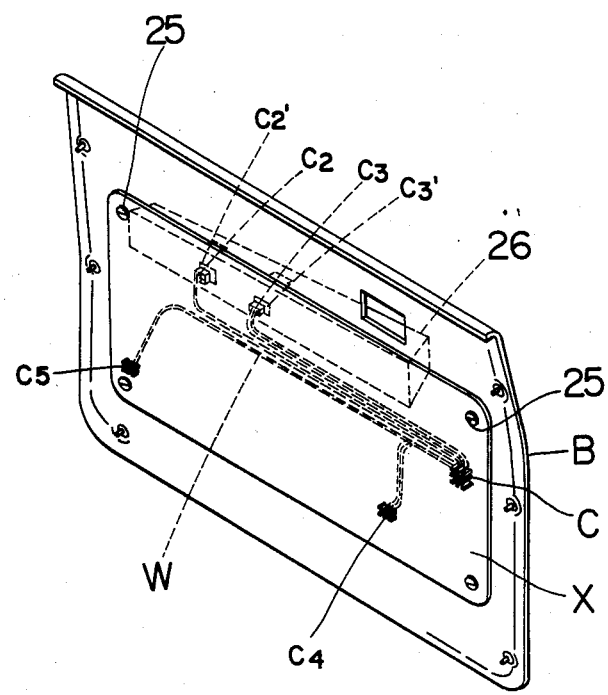
FIG. 27 is a perspective view of the mounting board of FIG. 26 already mounted to the covering board.
Figure 28:
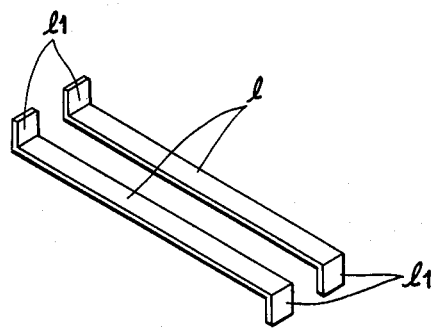
FIG. 28 is a perspective view showing one example of element wires which form the wire harness.
Figure 29:
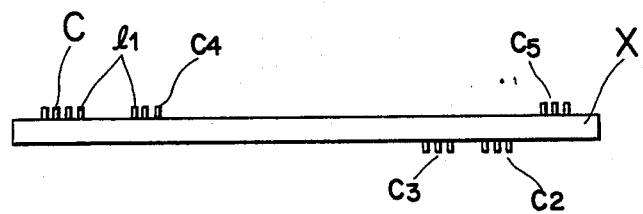
FIG. 29 is a plan view of the mounting of FIG. 26.
Figure 30:
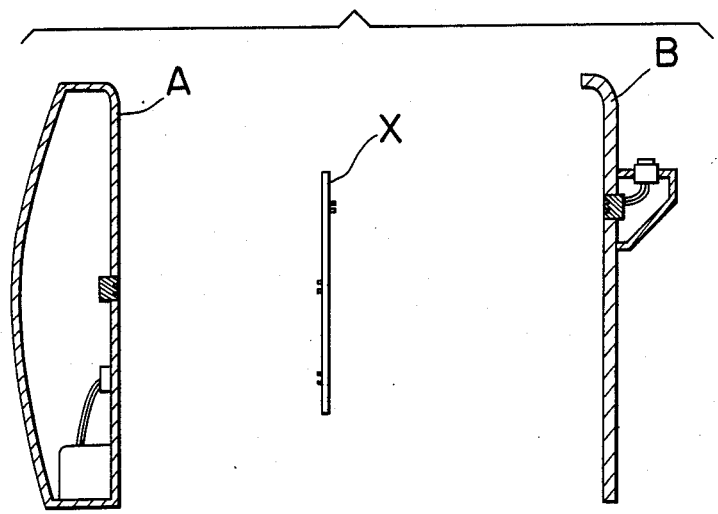
FIG. 30 is a sectional view of the above seventh embodiment, wherein the door frame, mounting board, and covering board are shown separated.

Referring to FIGS. 26 through 30, a seventh embodiment of the present invention will be described. In FIG. 26, respective conductors 1 of a door wire harness W are buried in a mounting plate X made of a synthetic resin material either in parallel or multi-layer form. The conductors 1 are formed of elongated materials or bar materials such as bus bars. As shown in FIG. 28, the conductors 1 each has a bent terminal portion 11 at its end portion.

The bent terminal portions 11 of the plurality of conductors 1 are concentratedly exposed from the mounting board X. A main connector C at one end portion of the door wire harness W, and connectors c4 and c5 which are to be attached to the branch wire portion are formed on the surface opposite to the door frame A, while connectors c2 and c3 are formed on the other surface thereof, opposite to the covering board B.

The door frame A is firmly attached at its internal surface with a connector C' attached to an end portion of a cowl side harness W' from the vehicle body, a connector c4 for a power wind motor 4 and a connector c5 for an automatic door locking solenoid 5 disposed at predetermined positions. The covering board B is firmly attached at its rear surface with a connector c2 for a trunk opening switch 2 and a connector c3 for a power wind switch 3, disposed at predetermined positions.

The mounting board X in the foregoing state is firmly secured to a predetermined position on the covering board B by screws 25 as shown in FIG. 27. At the same time, the corresponding connectors c2 and c2', and c3 and c3' are inter-connected respectively. Thereafter, the covering board B is mounted to the door frame A and the other connectors C and C', c4 and c4', and c5 and c5' are interconnected, respectively.

In the above embodiment, an arm supporting portion 26 serving as a switch unit, and including switches 2 and 3, is formed on the covering board B in advance. However, the arm supporting portion 26 may be fixed to the covering board B at the same time when the mounting board X is attached to the covering board B by bolts or other retaining means.

FIG. 31 illustrates a modified embodiment, in which a mounting board X, made of a metallic material or a synthetic resin material, is flatly fixed to its one surface with respective conductors 1 of a door wire harness W in parallel relation by bonding agents, adhesive tapes, or other similar means. At the same time, the mounting board X is firmly attached with a main connector C at one end portion of the door wire harness W and also with connectors c4 and c5 of branch wires w4 and w5, with the connecting portions thereof facing outward with respect to the door frame A. On the other hand, the mounting board X is firmly attached at its other surface with connectors c2 and c3 of branch wires w2 and w3 facing outward with respect to the covering board B.

The door frame A is firmly attached at its internal surface with a connector C', attached to an end portion of a cowl side harness W' from the vehicle body, a connector c4 for a power wind motor 4 and a connector c5 for an automatic door locking solenoid 5, disposed at predetermined positions. The covering board B is firmly attached at its rear surface with a connector c2 for a trunk opening switch 2 and a connector c3 for a power wind switch 3, disposed at predetermined positions.

The mounting board X in the foregoing state is firmly secured to a predetermined position on the covering board B by screws 25. At the same time, the corresponding connectors C and C', c4 and c4', and c5 and c5' are interconnected, respectively. Thereafter, the covering board B is mounted to the door frame A and the remaining connectors c2 and c2', and c3 and c3' are inter-connected, respectively.

Figure 32A:
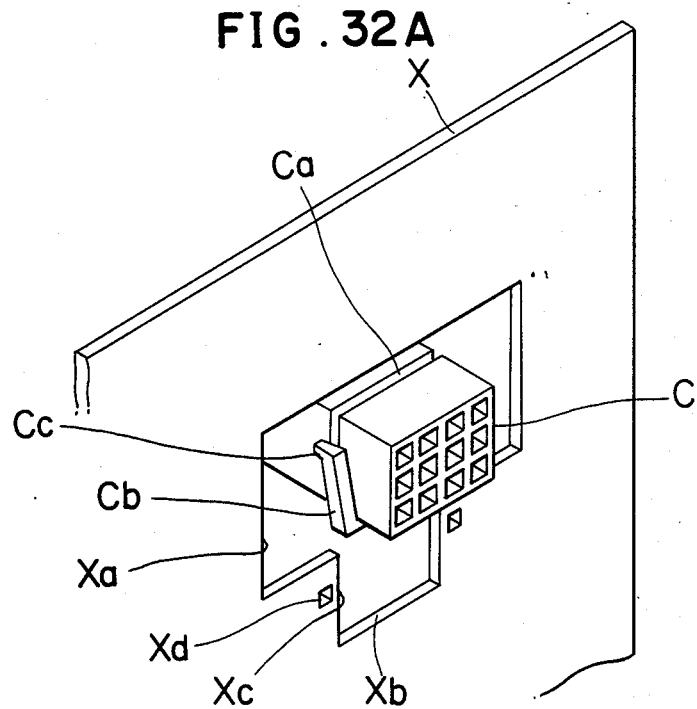
FIG. 32 A and FIG. 32 B are perspective views of one example of a connector mounting structure.
Figure 32B:
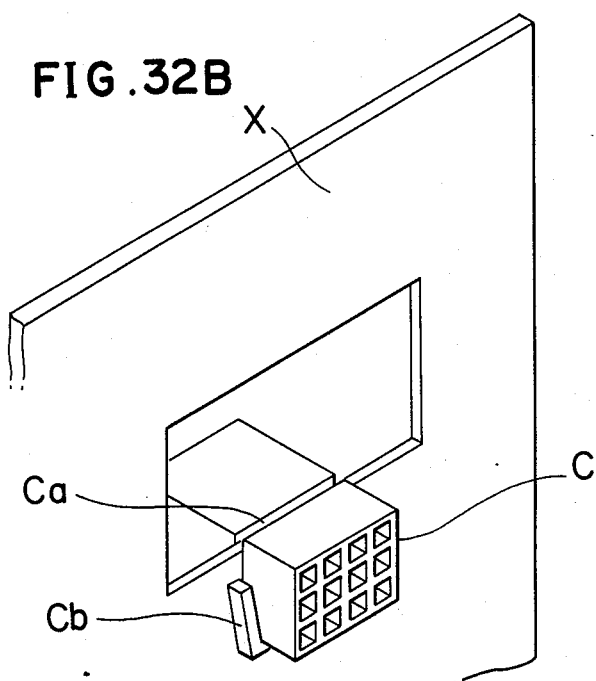

FIGS. 32A and B illustrate one example of a mounting structure of a connector C to be mounted to an internal surface board 30. The connector C is formed with a mounting groove Ca at an intermediate position along the outer peripheral portion thereof and is provided at both opposite surfaces with a locking arm Cb having its free end retaining portion Cc energized toward the groove portion Ca. By pushing the connector C into a retaining hole Xb through a comparatively large cut-out portion Xa formed in the internal surface board X, both edge board portions Xc engage the groove portion Ca. At this time, the retaining portion Cc of the locking arm Cb is engaged in the hole Xd of the surface board X, thereby locking the connector in place.

Figure 34:
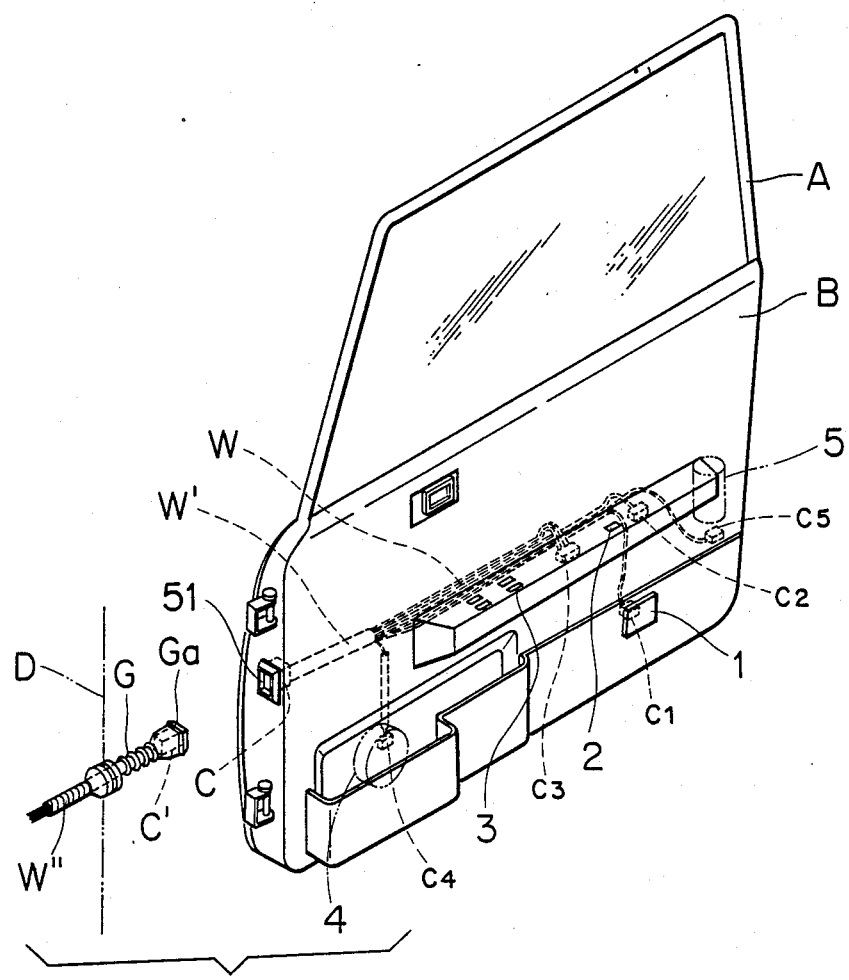
FIG. 34 is a perspective view showing the door wire harness of FIG. 33 on the covering board already mounted to the motor vehicle door.

Referring now to FIGS. 33 and 34, an eighth embodiment of the present invention will be described. In FIGS. 33 and 34, A denotes a door frame in a motor vehicle door, and B denotes a covering board to be attached to the internal side thereof. The covering board B is provided with the respective conductors for a door wire harness W flatly disposed thereon in parallel with one another by bonding agents, adhesive tapes, or other similar means.

The door wire harness W flatly disposed is provided with branch wires w1, w2, w3, w4, w5 ... having at end portions thereof connectors c1, c2, c3, c4, c5 ..., and disposed in such a manner as to be spaced apart from the covering board B. The door wire harness W is provided at its connecting end toward a cowl side harness at a vehicle body side, with a bundled leading-out portion W'. The bundled leading-out portion W' is provided with a main connector C, which is provided with a water proofing cover.

The flat-shaped wire harness W may use elongated materials or bar materials other than normal electric wires. When the elongated materials or bar materials are used, they are connected to the branch wires w1, w2 ... and the electric wires of the bundled leading-out portion through terminals by welding or other similar means.

The covering board B is provided with a cartesi-lamp 1, a trunk opening switch 2, and a power wind switch 3, to which the branch wires w1, w2 and w3 are connected in advance through the connectors c1, c2 and c3.

The covering board B in the foregoing state is combined with the door frame A of a motor vehicle in the production line of motor vehicles, and the branch wires w4 and w5 are connected to a power wind motor 4 and an automatic door locking solenoid 5 within the door frame A from working windows H, through the connectors c4 and c5. At the same time, the main connector attached to the bundled leading-out portion W' is pushed sideways into a leading-out hole 6 in order to have a retaining board 6a engage groove 40. Thereafter, the covering board B is fixed to the door frame A.

In the foregoing state, a main connector C', is disposed within the grommet G for the cowl side harness W' inserted in an inserting hole 49 formed in the vehicle body D, and is thereby connected to the main connector C attached to an end portion of the door frame A.

Figure 35:
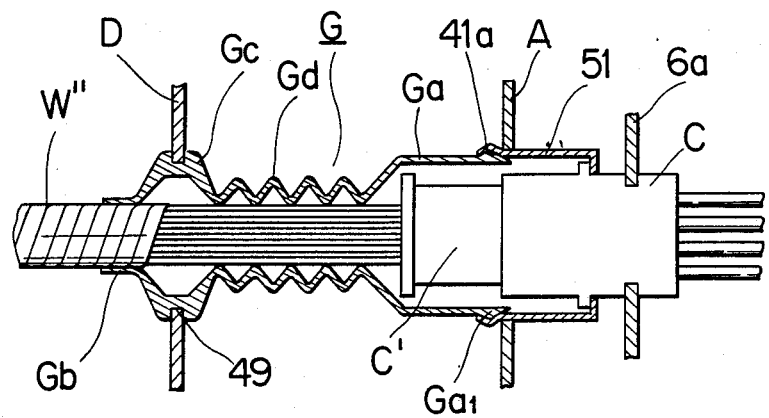
FIG. 35 is a sectional view of the connecting section of a connector of FIG. 34.

FIG. 35 illustrates a section of the main connectors C and C' in operative engagement with each other. The main connector C is provided with a water-proofing cover 51 made of a rubber material. An annular projection Ga1 formed on a connector water-proofing cover portion Ga of the grommet G is engaged in an annular groove 51a formed in the water-proofing cover 51. The grommet G is formed of a rubber material extending in a series from a stationary cylindrical portion Gb with respect to the wire harness, through an annular engaging portion Gc and an expanding and contracting according-like portion Gd, to the connector water-proofing cover portion Ga.

Figure 36:
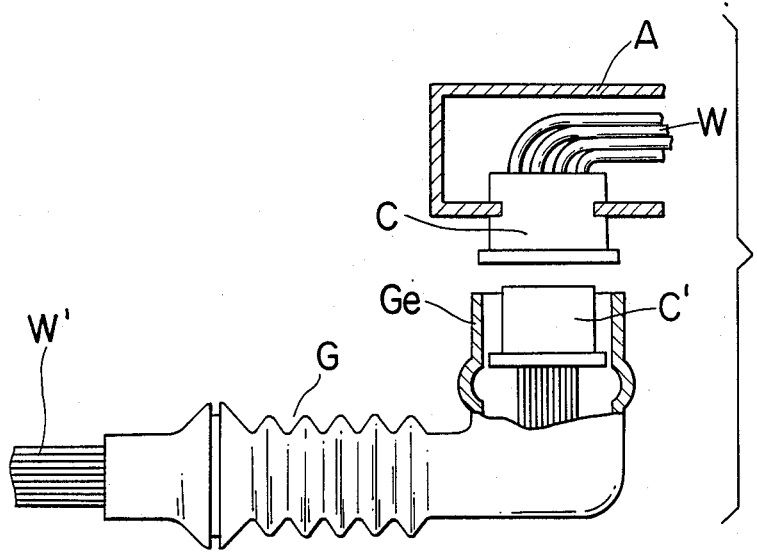
FIG. 36 is a plan view, partly exploded, of a connector connecting section according to a modified embodiment of the invention.

In FIG. 36, the main connector C at the door side is fixed to an end portion of the door frame A facing the internal surface side thereof. An end portion of the grommet G in the cowl side wire harness W' is provided with a connector water-proofing cover portion Ge bent by 90° with respect to the extending direction of the grommet G.

In the above embodiment, the main connector is fixed to an end portion of the door wire harness, and the vehicle body side wire harness is drawn out from an inserting hole through a grommet, and the main connector at the end portion thereof is connected to the main connector fixed to the door. Alternatively, the main connector at the end portion of the vehicle body side wire harness may be fixed, and the drawing-out end portion of the door wire harness may be connected thereto.

Figure 37:
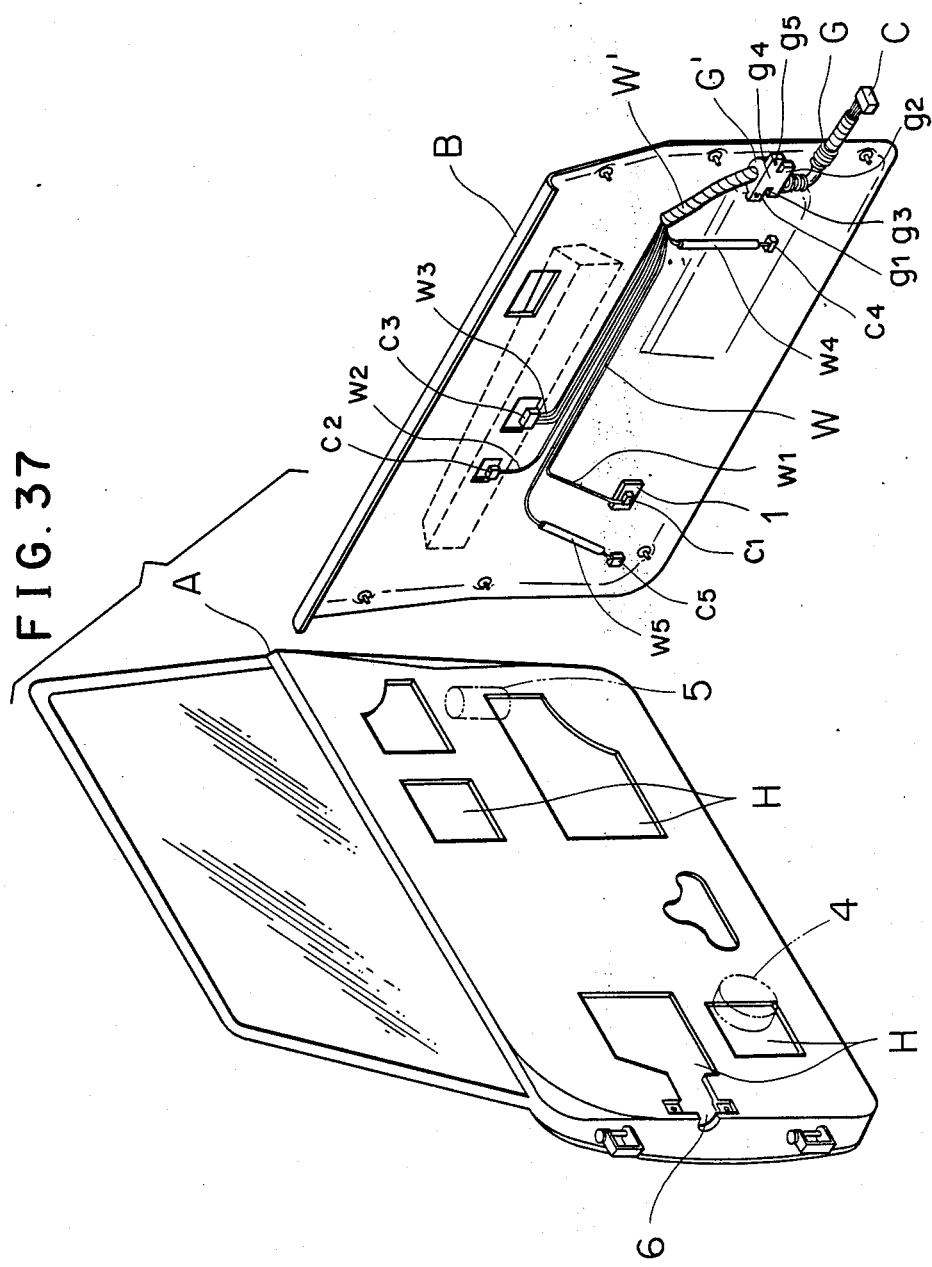
FIG. 37 is an exploded perspective view of a wire harness disposed on a covering board in relation to a motor vehicle door to which the board is to be mounted according to a ninth embodiment of the present invention.
Figure 38:
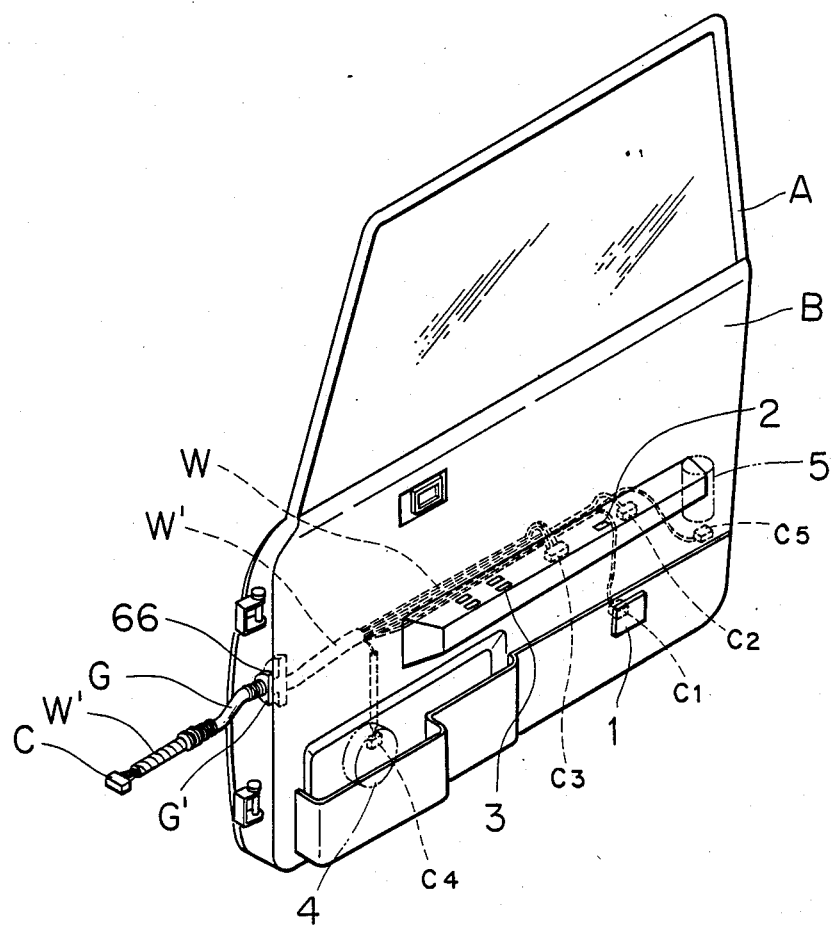
FIG. 38 is a perspective view of the wire harness of FIG. 37 already mounted to the door frame.
Figure 39A:
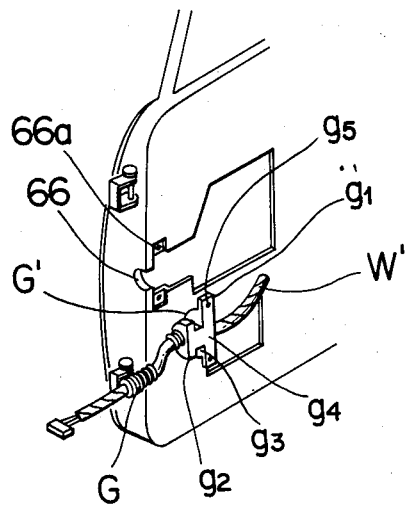
FIG. 39 A and FIG. 39 B are perspective views showing an exploded state of a portion of the wire harness of FIG. 37, and a mounted state of the portion thereof, respectively.
Figure 39B:
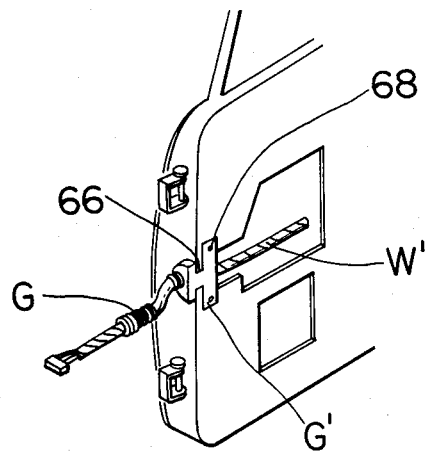

Referring now to FIGS. 37 through 39, a ninth preferred embodiment of the invention will be described. In FIG. 37, A denotes a door frame for a motor vehicle door, and B denotes a covering board to be attached to the internal side thereof. The covering board B is provided with conductors for a door wire harness W flatly disposed thereon in parallel with one another by bonding agents, adhesive tapes, or other similar means.

The door wire harness flatly disposed is provided with branch wires w1, w2, w3, w4, w5 ... having at end portions thereof connectors c1, c2, c3, c4, c5 ..., and is disposed in such a manner as to be spaced apart form the covering board B. The door wire harness W is provided at its connecting end, toward a cowl side harness at a vehicle body side, with a bundled leading-out portion W'. The bundled leading-out portion W' is provided with a water proofing portion such as a grommet G. The door side end portion of the grommet G is formed with an engaging portion G' formed of large and small flanges g1 and g2 with a groove portion g3 formed therebetween. The internal side flange g1 is formed at its upper and lower sides with mounting holes g5, opposite to mounting holes 66a, which are formed in a mounting groove portion 66 of the door frame A.

The flat-shaped wire harness W may use elongated materials or rod materials other than normal electric wires. When the elongated materials or rod materials are used, they are connected to the branch wires w1, w2 etc. and the electric wires of the bundled leading-out portion W' through terminals by welding or other similar means.

The covering board B is provided, with electric equipment cartesi-lamp 1, trunk opening switch 2, and power wind switch 3, to which the branch wires w1, w2 and w3 are connected in advance through the connectors c1, c2 and c3.

The covering board B in the foregoing state is combined with the door frame A of a motor vehicle in the production line of motor vehicles, and the branch wires w4 and w5 are connected to a power wind motor 4 and an automatic door locking solenoid 5 within the door frame A through the connectors c4 and c5. At the same time, an engaging portion G', at the water proofing portion such as the grommet G, in the bundled leading-out portion W' is pushed sideways into a mounting groove 66 formed in an end portion of the door frame at the hinge mounting side for engagement, and is fixed thereto by machine screws 68 through mounting holes g5 and 66a. Thereafter, the covering board B is fixed to the door frame A to cause it to intimately contact an internal side flat portion g4 of the engaging portion G' for obtaining a satisfactory water-proofing arrangement (FIG. 38).

Figure 40:
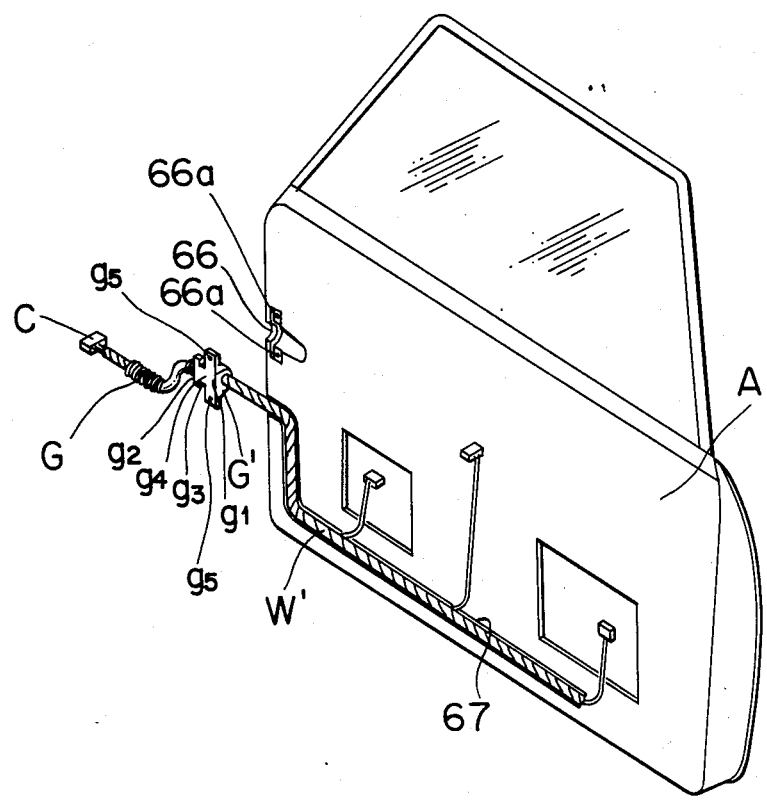
FIG. 40 is an exploded perspective view showing a modified embodiment of the harness of FIG. 37.
Figure 41:
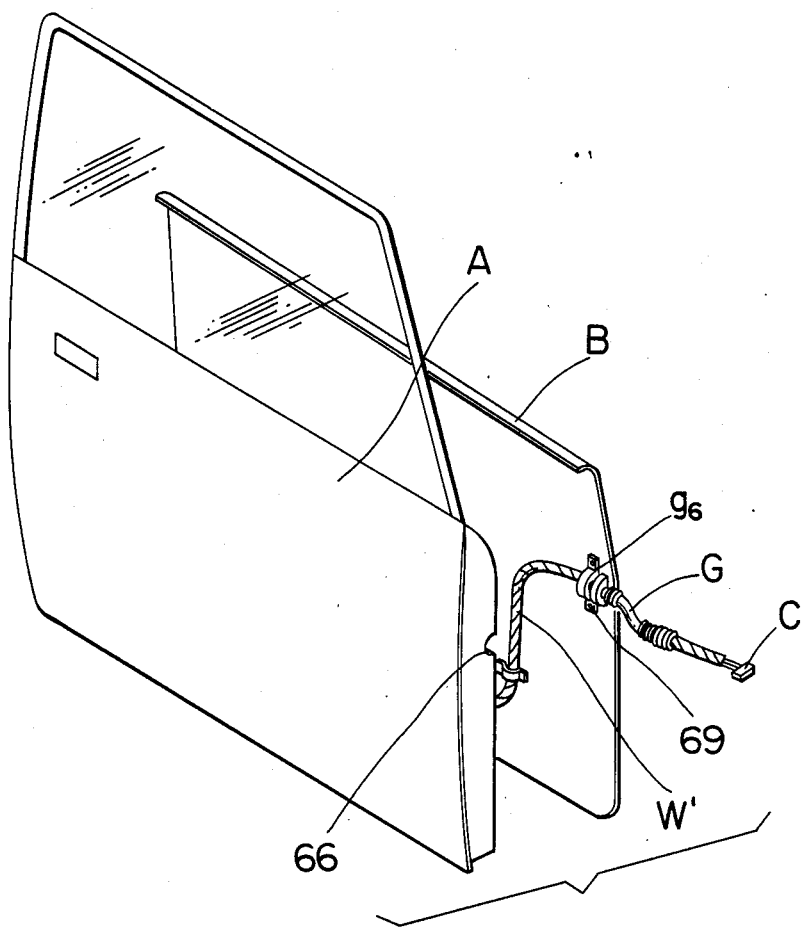
FIG. 41 is an exploded perspective view showing a still further modified embodiment.

In a modified embodiment shown in FIG. 40, the door wire harness W is of a bundled shape as shown in FIG. 41. In this embodiment, the door wire harness W is wired within a groove 67 formed in the door frame A. The engaging portion G' of the grommet G provided at the end portion of the wire harness W is engaged in the mounting groove 66 formed in the door frame A, and thereafter, the covering board B is mounted to form a water-proofing portion.

In a modified embodiment shown in FIG. 41, the grommet G is provided with a mounting flange G6 with holes displaced at the end thereof. The grommet G and the covering board B can be fixed to the door frame A by one action if the grommet G is fixed to the covering board B by engagement means, such as a clip 69, pushed into the holes in the covering board B.

Figure 42:
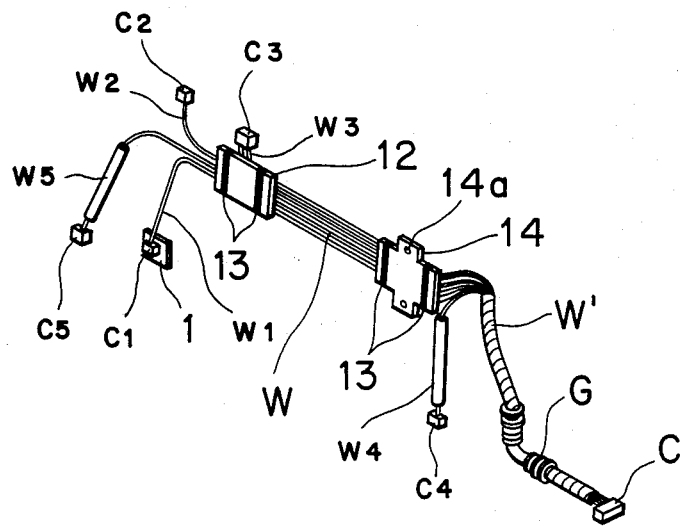
FIG. 42 is a perspective view showing a wire harness prepared through a modified method before mounting it to the mounting means used in the invention.

In any of the foregoing embodiments, wires are attached one by one to mounting means such as the covering board B, the wire harness wiring board B1 of the covering board B, the electric equipment mounting board section BI of the covering board B, internal side board section A or the mounting board X to form a wire harness thereon. However, the wire harness may be integrally produced beforehand, independent of the above mounting means as shown in FIG. 42. In other words, said wires W are connected to each other in a parallel flat fashion by heat melting the insulation covering of the wire or via adhesive layer. Further, a reinforcing plate 12 may be attached to one end portion of the connected wire bundle, so as to be fastened by a tape 13 or the like, whereas a metal protector 14 having fixture holes 14a is attached to the other end portion thereof to be fastened by tape 13. The thus formed wire harness is attached to the above mentioned mounting means.

As described in the foregoing, a wire harness mounting structure for a motor vehicle door comprises a door frame and planar mounting means detachably attached to said door frame at an internal side of the motor vehicle, having a wire harness mounted thereon, said means extending in a plane generally parallel to said door frame. The mounting means is either in the form of a covering board, or a combination of the covering board and an internal side board mounted between the vehicle door frame and the covering board, and is either integrally formed with the covering board, or rigidly formed independent of the board, as in the case of an internal side board. Since the door wire harness is flatly disposed on the mounting means, such as a covering board which is to be attached to the internal side of a motor vehicle door, a part of the branch wires are connected, in advance, to electric equipment provided at the covering board, etc.; the remaining branch wires are connected to electric equipment provided within the door frame, and thereafter the covering board is fixed to the door frame, thereby simplifying and accelerating mounting work of the door wire harness in the production line of motor vehicles. Furthermore, since the wire harness is flatly disposed on the mounting means only limited space is required, and wiring work can be carried out linearly and by way of the shortest distance, contrary to the conventional method wherein the wiring work is carried out in such a manner as to require finding a remaining space during wiring. Furthermore, since the door wire harness is fixed to mounting means having a constant shape, such as the covering board, there is little possibility that the branch wires will be entangled when it is transported, stored, and mounted to the door frame. In addition, even if it is used in circumstances under severe vibration, the wire harness can be held stably.

Although the present invention has been described in its preferred forms with a certain degree of particularity, it is understood that the present disclosure of the preferred forms has been made only by way of example and that numerous changes in the details of construction and arrangement of parts may be resorted to without departing from the spirit and the scope of the invention as hereinafter claimed. Also, in the above embodiments, the wire harness is mounted to a motor vehicle door, the invention can of course be applied to other cases in which other wire harnesses are mounted to the inside of the vehicle body.

I claim:
1. A structure mountable on the frame of a hinge-mounted motor vehicle door for conveniently interconnecting at least one piece of electrical equipment mounted on the door frame with a control device therefore, said structure comprising:
   rigid and substantially planar mounting means adapted for detachable mounting on said door frame comprising a rigid covering board having internal and external surfaces for covering the side of said door frame that is internal of the motor vehicle,
   a respective control device for each said at least one piece of electrical equipment mounted on said external surface of said covering board, and
   a wire harness including a main section and a plurality of branch wires branched from said main section, said main section of said wire harness being flatly and rigidly supported on said internal surface of said covering board, said branch wires having end portions separated from said covering board and being divided into first and second groups, a selected wire of said first group of branch wires being connected to one of the control devices mounted on said covering board, and a selected wire of said second group of branch wires having a connector at an end thereof which is adapted to be connected to said at least one piece of electrical equipment mounted on said door frame when said covering board has been assembled with said door frame.

2. A structure for quickly and easily mounting a wire harness including a main section and a plurality of branch wires branched from said main section on the frame of a motor vehicle door as to be conveniently connectable to at least one piece of electrical equipment mounted on said door frame, said structure comprising:

rigid planar mounting means adapted to be detachably secured to the side of said door frame that is internal of the motor vehicle, said mounting means comprising a rigid covering board consisting of first and second sections each of generally rectangular shape arranged one above the other and adapted to be independently secured to said door frame, said first section having electric equipment mounted thereon, and means for flatly mounting said main section of said wire harness on said first section of said covering board.

3. A mountable structure according to claim 1, wherein one end of said main section of said wire harness is terminated in a bundled leading-out portion which is attached to a main connector having a water-proof cover, and wherein said water-proof cover extends through and engages a mounting groove formed in said door frame at the hinge-mounted end of said door, and wherein said mounting groove has a grommet therein for engaging the water-proof cover of said main connector.

4. A structure according to claim 3, wherein said structure further comprises a cowl-side wiring harness from said motor vehicle contained in said grommet and having attached thereto a vehicle-body connector adapted to be mutually interconnected with said main connector, said grommet comprising a cylindrical portion stationary with respect to said cowl-side wiring harness, an annular engaging portion, and an expanding and contracting accordion-like portion between said annular engaging portion and a water-proofing portion surrounding said vehicle body connector.

5. A structure according to claim 4 wherein said water-proofing portion surrounding said vehicle body connector is angled with respect to said cylindrical stationary portion.

6. A structure according to claim 1, wherein the main section of said wire harness is flatly and rigidly supported on a harness wiring board portion of said covering board, and wherein said harness wiring board portion is detachably secured in a hole formed in said covering board.

7. A structure mountable on the frame of a motor vehicle door for conveniently interconnecting at least one piece of electrical equipment mounted on the door frame with a respective control device therefore, said structure comprising:

a rigid substantially planar internal side board secured to said door frame at the internal side of the motor vehicle, said side board having at least one working window therethrough located near said at least one piece of electrical equipment, a portion of said side board being detachably secured in an opening formed in said side board, a rigid covering board having internal and external surfaces for covering the side of the door frame that is internal of the motor vehicle, said covering board having mounted on the external surface thereof a respective control device for each said at least one piece of electrical equipment; and a wire harness including a main section and a plurality of branch conductors branched from said main section; said main section of said wire harness being flatly and rigidly supported on the detachable portion of said internal side board, said branch conductors having end portions separated from said detachable portion of the internal side board and being divided into first and second groups, a selected conductor of said first group having a connector at an end thereof which is connected, through the working window in the internal side board, to said at least one piece of electrical equipment, and a first conductor of said second group of branch conductors being adapted to be connected, when said covering board has been assembled with said door frame, to the control device mounted on said covering board that controls said at least one piece of electrical equipment.

8. A structure mountable on the frame of a motor vehicle door for conveniently interconnecting at least one piece of electrical equipment mounted on the door frame with a control device therefore, said structure comprising:

a rigid covering board having internal and external surfaces for covering the side of said door frame that is internal of the motor vehicle, said covering board having mounted thereon a respective control device for each said at least one piece of electrical equipment;

a mounting board having a first side and a second side, said mounting board being disposed between said covering board and said door frame and detachably attached to a selected one of said door frame and said covering board;

wire harness means having a main section attached to said mounting board and a plurality of branch conductors branched from said main section and divided into first and second groups; and a plurality of connectors fixedly mounted on each side of said mounting board, the plurality of connectors mounted on the first side being connected to said first group of branch conductors and the plurality of connectors mounted on the second side being connected to said second group of branch conductors, one of the connectors mounted on the first side of said mounting board being adapted to be connected, on assembly of said mounting board with the door frame, to said at least one piece of electrical equipment, and one of the connectors mounted on the second side of said mounting board being adapted to be connected, on assembly of said mounting board with said covering board, to a control device on said covering board for said at least one piece of electrical equipment.

9. A structure mountable on the frame of a hinge-mounted motor vehicle door for conveniently interconnecting at least one piece of electrical equipment mounted on the door frame with a control device therefore, said structure comprising:

a rigid covering board having internal and external surfaces detachably attached to said door frame for covering the side of said door frame that is internal of the vehicle, said covering board having mounted thereon a respective control device for each said at least one piece of electrical equipment;

wire harness means including a main section flatly and rigidly attached to said covering board and a plurality of branch wires branched from said main section, said branch wires having end portions separated from said covering board and divided into first and second groups, one branch wire of said first group being connected to the control device for said at least one piece of electrical equipment, and one branch wire of said second group having a connector at an end thereof which is adapted to be connected, when said covering board has been attached to said door frame, to said at least one piece of electrical equipment, one end of the main section of said wire harness means being terminated in a bundled leading-out portion which is attached to a main connector having a water-proof cover which extends through and engages a mounting groove formed in said door frame at the hinge-mounted end of said door, said mounting groove having a grommet therein for engaging the cover of said main connector.

10. A structure according to claim 9, wherein said structure further comprises a cowl-side wiring harness from said motor vehicle contained in said grommet and having attached thereto a vehicle body connector adapted to be mutually interconnected with said main connector, and wherein said grommet comprises a cylindrical portion which is stationary with respect to said cowl-side wiring harness, an annular engaging portion, and an accordion-like expanding and contracting portion disposed between said annular engaging portion and a water-proofing portion surrounding said vehicle body connector.

11. A structure according to claim 8, wherein said wire harness includes conductors buried within said mounting board and has a connector attached to an end of each of said branch conductors, at least one of said connectors being disposed on the surface of said mounting board that faces said door frame and positioned thereon for connection to said at least one piece of electrical equipment, and at least one other of said connectors being disposed on the surface of said mounting board that faces said covering board and positioned for connection to the control device for said at least one piece of electrical equipment.

* * * * *